(12) United States Patent
Komiya et al.

(10) Patent No.: US 10,764,604 B2
(45) Date of Patent: Sep. 1, 2020

(54) MOVING PICTURE ENCODING METHOD, MOVING PICTURE ENCODING APPARATUS, MOVING PICTURE DECODING METHOD, AND MOVING PICTURE DECODING APPARATUS

(71) Applicant: Panasonic Intellectual Property Corporation of America, Torrance, CA (US)

(72) Inventors: Daisaku Komiya, Tokyo (JP); Takahiro Nishi, Nara (JP); Youji Shibahara, Osaka (JP); Hisao Sasai, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 235 days.

(21) Appl. No.: 14/343,870

(22) PCT Filed: Sep. 20, 2012

(86) PCT No.: PCT/JP2012/005964
§ 371 (c)(1),
(2) Date: Mar. 10, 2014

(87) PCT Pub. No.: WO2013/042359
PCT Pub. Date: Mar. 28, 2013

(65) Prior Publication Data
US 2014/0219338 A1 Aug. 7, 2014

Related U.S. Application Data

(60) Provisional application No. 61/537,796, filed on Sep. 22, 2011.

(51) Int. Cl.
*H04N 19/30* (2014.01)
*H04N 19/187* (2014.01)
(Continued)

(52) U.S. Cl.
CPC ......... *H04N 19/597* (2014.11); *H04N 19/105* (2014.11); *H04N 19/12* (2014.11);
(Continued)

(58) Field of Classification Search
CPC ....... H04N 13/00321; H04N 13/00769; H04N 7/24; H04N 7/26; H04N 13/02;
(Continued)

(56) References Cited

U.S. PATENT DOCUMENTS

| 8,218,628 B2 | 7/2012 | Schwarz et al. |
| 2005/0018911 A1 | 1/2005 | Deever |

(Continued)

FOREIGN PATENT DOCUMENTS

| JP | 2003-319416 | 11/2003 |
| JP | 2006-528870 | 12/2006 |

(Continued)

OTHER PUBLICATIONS

International Search Report dated Dec. 25, 2012 in International (PCT) Application No. PCT/JP2012/005964.

*Primary Examiner* — Albert Kir
(74) *Attorney, Agent, or Firm* — Wenderoth, Lind & Ponack, L.L.P.

(57) ABSTRACT

A spatially scalable-multiview moving picture encoding apparatus includes: a base layer encoder which encodes a base layer; an enhancement layer encoder which performs spatially scalable encoding on an enhancement layer, using a reconstructed image of the base layer generated by the base layer encoder; an enhancement view base layer encoder which performs multiview encoding on the base layer of the (Continued)

enhancement view, using a reconstructed image of the base layer generated by the base layer encoder; and an enhancement view enhancement layer encoder which performs multiview encoding on the enhancement layer of the enhancement view, using a reconstructed image of the enhancement layer generated by the enhancement layer encoder.

6 Claims, 31 Drawing Sheets

(51) Int. Cl.
    *H04N 19/597* (2014.01)
    *H04N 19/46* (2014.01)
    *H04N 19/12* (2014.01)
    *H04N 19/33* (2014.01)
    *H04N 19/105* (2014.01)
    *H04N 19/70* (2014.01)

(52) U.S. Cl.
    CPC ........... *H04N 19/187* (2014.11); *H04N 19/33* (2014.11); *H04N 19/46* (2014.11)

(58) Field of Classification Search
    CPC ........ H04N 7/12; H04N 19/30; H04N 19/187; H04N 19/597; G06K 9/36
    USPC .... 375/240, 240.25, 240.12, 240.16, 240.02; 348/51; 382/232
    See application file for complete search history.

(56) References Cited

U.S. PATENT DOCUMENTS

| | | | |
|---|---|---|---|
| 2006/0083308 A1 | 4/2006 | Schwarz et al. | |
| 2006/0083309 A1 | 4/2006 | Schwarz et al. | |
| 2008/0247462 A1* | 10/2008 | Demos ................. | H04N 19/597 375/240.03 |
| 2009/0003431 A1* | 1/2009 | Zhu ................. | H04N 21/234327 375/240.01 |
| 2010/0202540 A1* | 8/2010 | Fang .............. | H04N 21/234327 375/240.16 |
| 2010/0290518 A1* | 11/2010 | Lee ....................... | H04N 19/597 375/240.01 |
| 2011/0012994 A1* | 1/2011 | Park ............... | H04N 21/234327 348/43 |
| 2011/0038421 A1 | 2/2011 | Schwarz et al. | |
| 2011/0043524 A1* | 2/2011 | Chen ...................... | G06Q 30/02 345/427 |
| 2011/0043608 A1* | 2/2011 | Chen .................... | H04N 19/597 348/43 |
| 2011/0134214 A1 | 6/2011 | Chen et al. | |
| 2011/0222605 A1* | 9/2011 | Kashiwagi ........... | H04N 19/597 375/240.16 |
| 2012/0075436 A1* | 3/2012 | Chen .................... | H04N 19/597 348/51 |
| 2012/0250759 A1 | 10/2012 | Schwarz et al. | |
| 2012/0250760 A1 | 10/2012 | Schwarz et al. | |
| 2012/0269275 A1* | 10/2012 | Hannuksela ....... | H04N 13/0048 375/240.25 |
| 2013/0195169 A1* | 8/2013 | Jang ................. | H04N 19/00424 375/240.02 |

FOREIGN PATENT DOCUMENTS

| | | |
|---|---|---|
| JP | 2008-517499 | 5/2008 |
| JP | 2010-507961 | 3/2010 |
| WO | 2005/011284 | 2/2005 |
| WO | 2006/042611 | 4/2006 |
| WO | 2006/042612 | 4/2006 |
| WO | 2008/051041 | 5/2008 |
| WO | WO 2008051041 A1 * | 5/2008 ....... H04N 21/64792 |

* cited by examiner

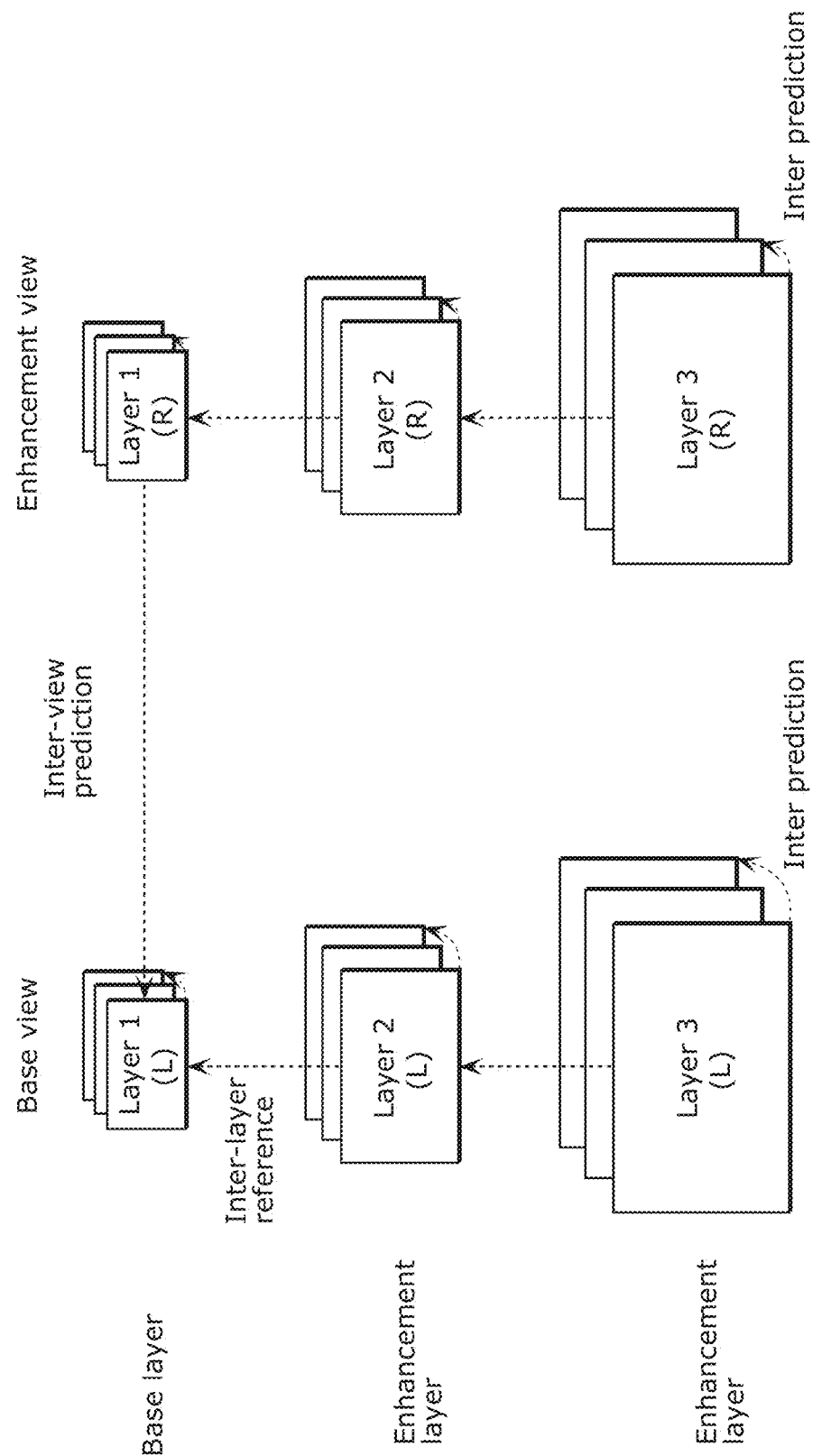

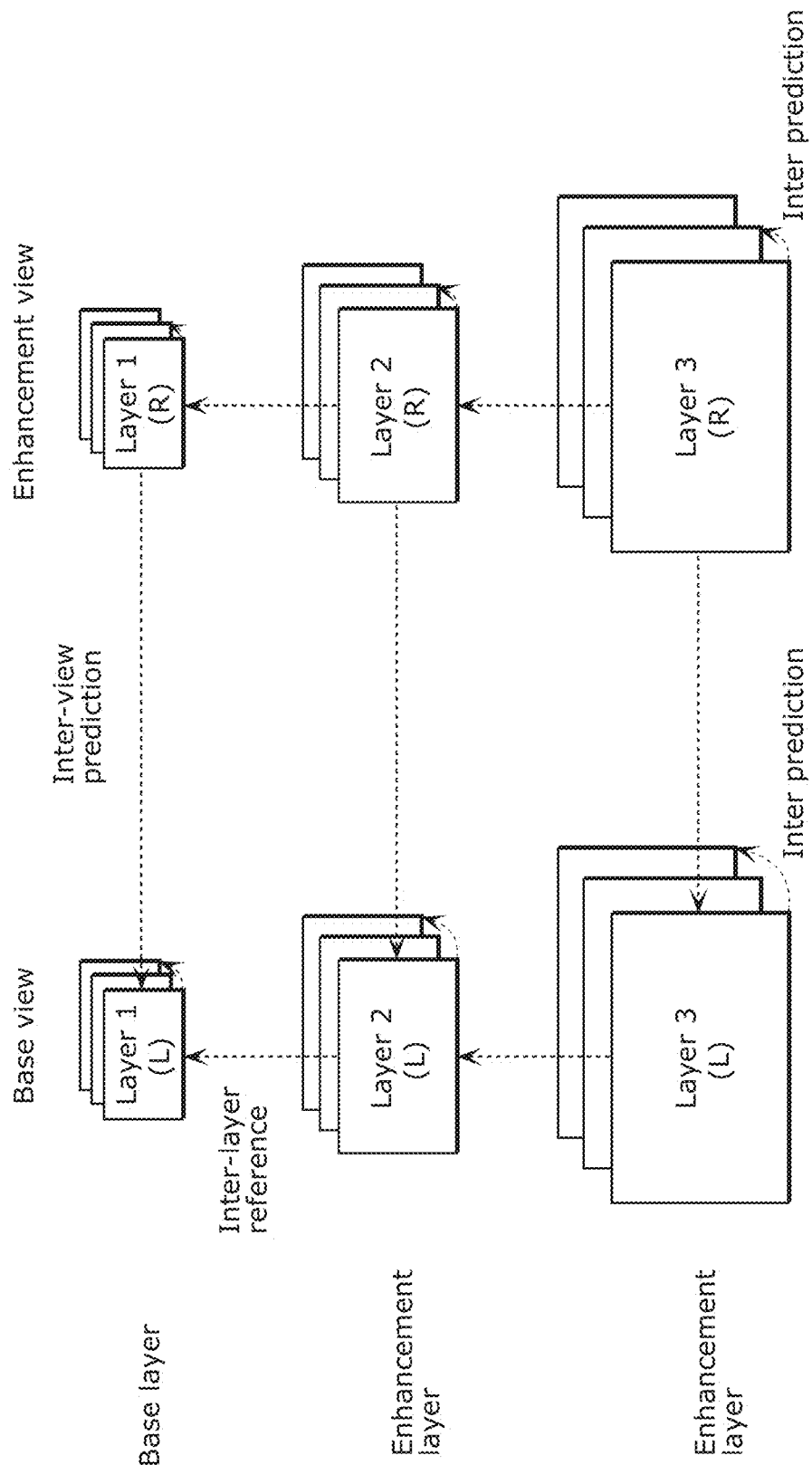

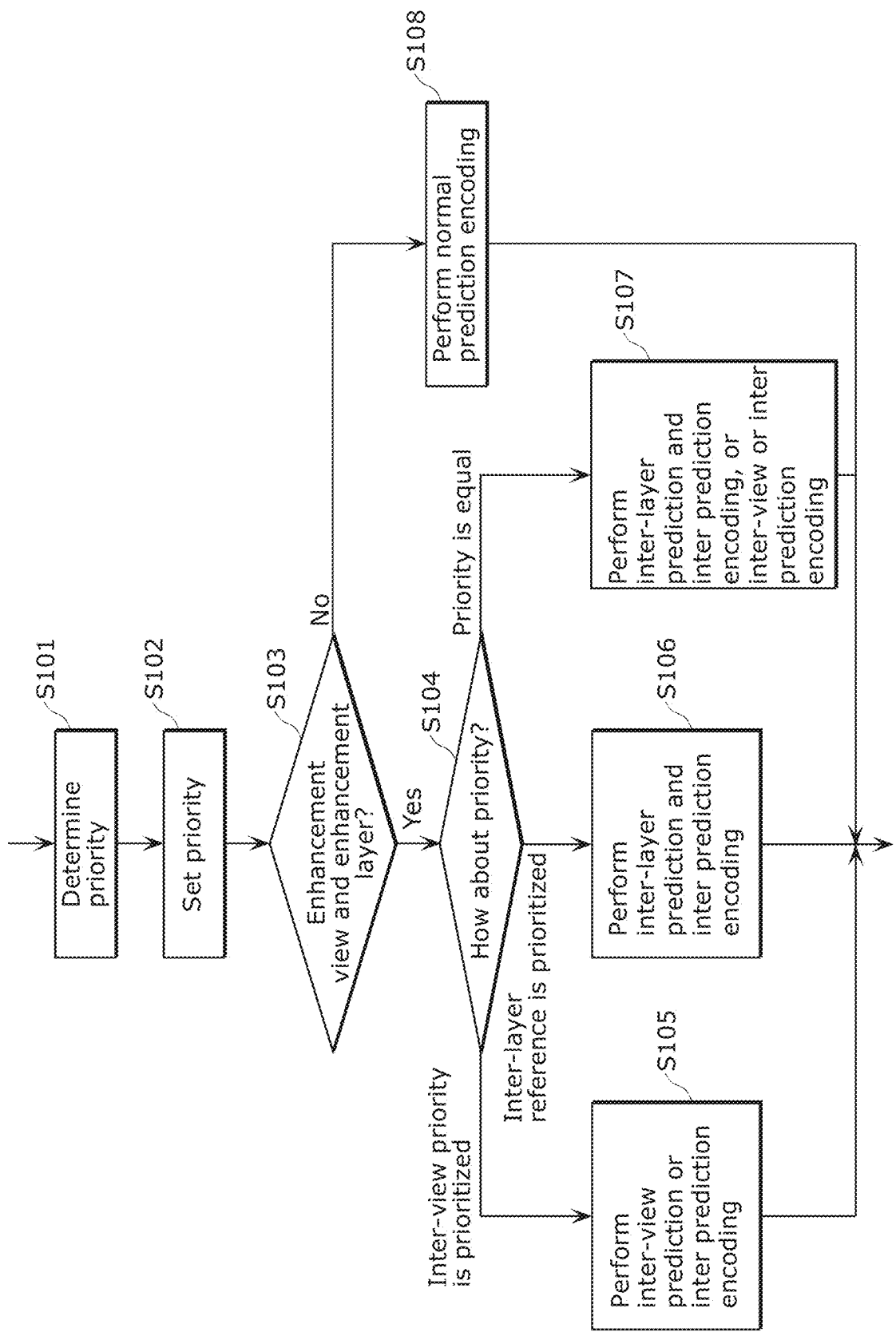

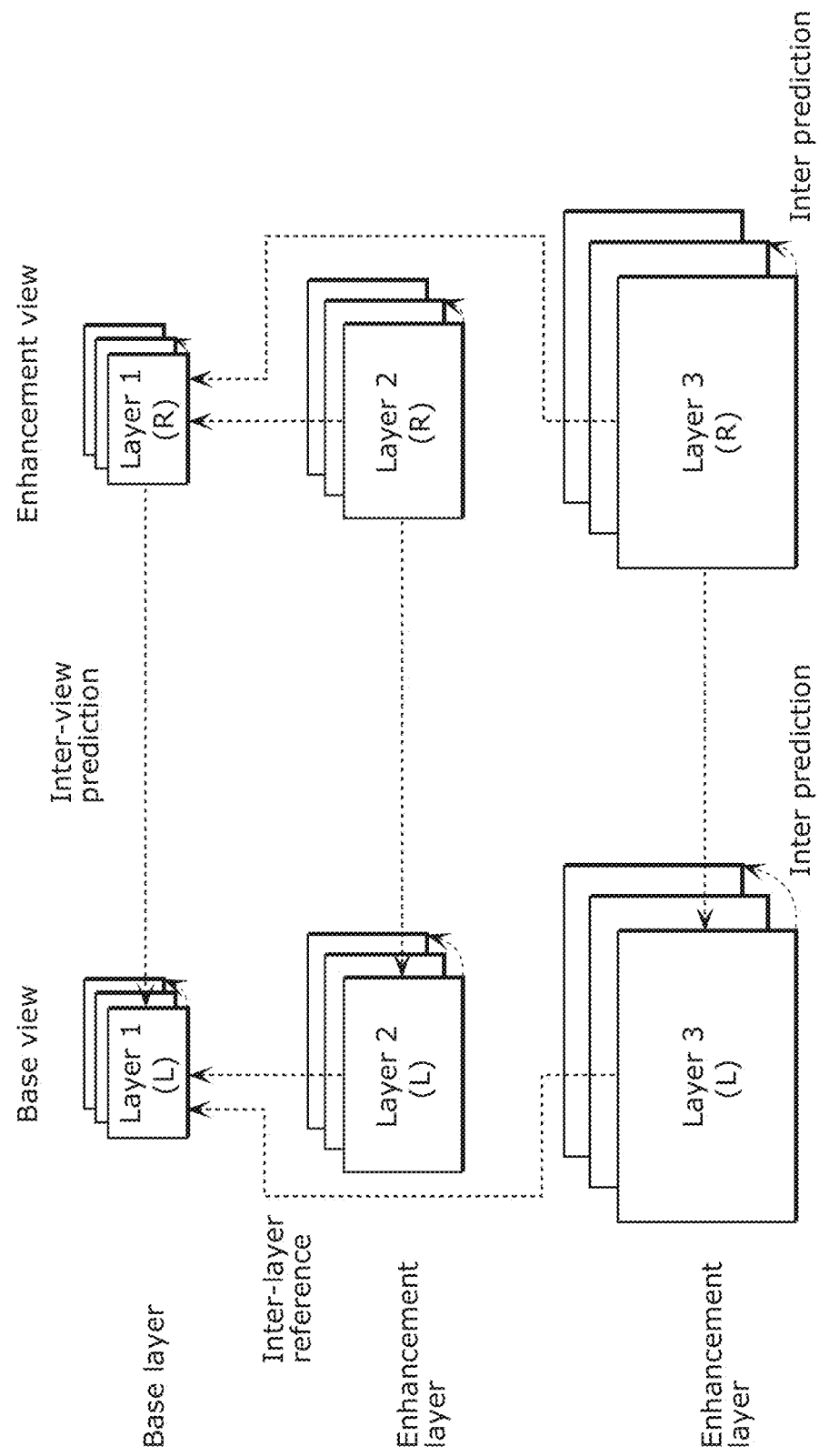

FIG. 18

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 29
| Corresponding standard | Driving frequency |
|---|---|
| MPEG-4 AVC | 500 MHz |
| MPEG-2 | 350 MHz |
| ⋮ | ⋮ |
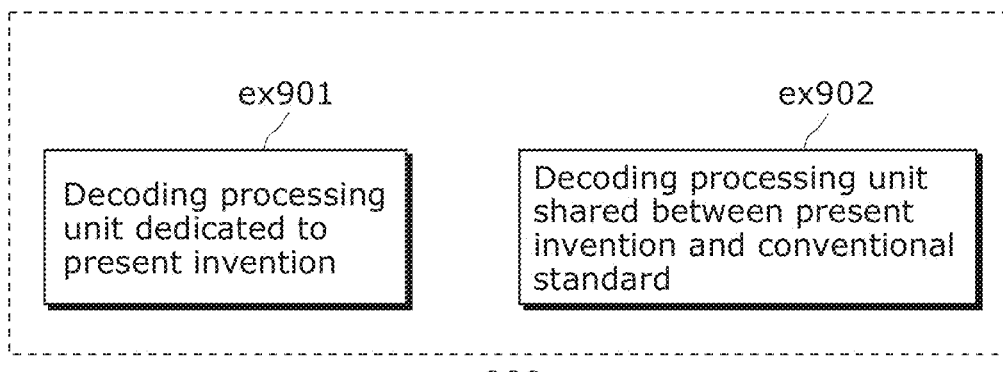
FIG. 30A
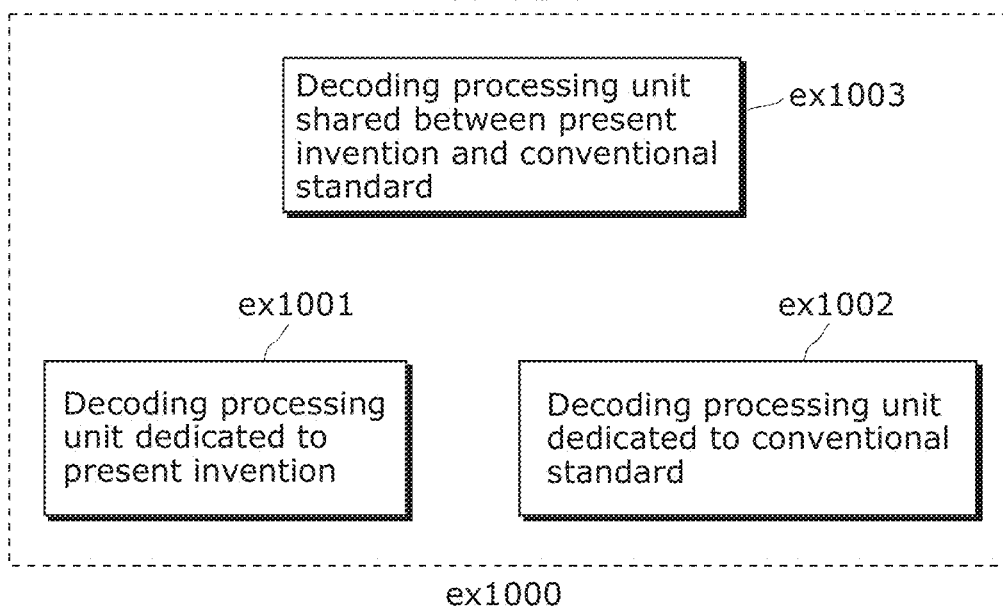
FIG. 30B

MOVING PICTURE ENCODING METHOD, MOVING PICTURE ENCODING APPARATUS, MOVING PICTURE DECODING METHOD, AND MOVING PICTURE DECODING APPARATUS

TECHNICAL FIELD

The present invention relates to a moving picture encoding method and a moving picture decoding method.

BACKGROUND ART

A moving picture encoding method called H.264 is already standardized. Using the H.264 moving picture encoding standard, spatially scalable image encoding and multiview image encoding are performed.

SUMMARY OF INVENTION

Technical Problem

Conventionally, when encoding is performed by a combination of spatially scalable image encoding and multiview encoding, there is a problem that the load of decoding processing is high and decoding efficiency is low.

In view of this, the present invention provides a moving picture encoding apparatus and a moving picture encoding method which make it possible to increase decoding efficiency.

Solution to Problem

A moving picture encoding apparatus according to one aspect of the present invention is a moving picture encoding apparatus which performs spatially scalable encoding on an input image including a base layer and one or more enhancement layers, and performs multiview image encoding on a base view and one or more enhancement views, and the moving picture encoding apparatus includes: a base layer encoder which encodes the base layer; an enhancement layer encoder which performs spatially scalable encoding on the enhancement layer using a reconstructed image of the base layer, the reconstructed image being generated by the base layer encoder; an enhancement view base layer encoder which performs multiview encoding on the base layer of the enhancement view using the reconstructed image of the base layer, the reconstructed image being generated by the base layer encoder; and an enhancement view enhancement layer encoder which performs multiview encoding on the enhancement layer of the enhancement view using a reconstructed image of the enhancement layer, the reconstructed image being generated by the enhancement layer encoder.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

Advantageous Effects of Invention

Since the present invention makes it possible to set priority of inter-layer reference and inter-view reference, the present invention makes it possible to increase decoding efficiency of bitstream which is encoded by a combination of spatially scalable image encoding and multiview image encoding.

BRIEF DESCRIPTION OF DRAWINGS

FIG. 6B is a diagram showing a prediction structure of an input image in pattern 2.

FIG. 6C is a diagram showing a prediction structure of an input image in pattern 3.

FIG. 7 is a diagram showing a process flow by the spatially scalable-multiview moving picture encoding apparatus.

FIG. 9A is a diagram showing an example of a prediction structure of an input image.

FIG. 18 illustrates a structure of multiplexed data.

FIG. 29 shows an example of a look-up table in which video data standards are associated with driving frequencies.

FIG. 30A is a diagram showing an example of a configuration for sharing a module of a signal processing unit.

FIG. 30B is a diagram showing another example of a configuration for sharing a module of the signal processing unit.

DESCRIPTION OF EMBODIMENTS

Underlying Knowledge Forming Basis of the Present Invention

In relation to a control apparatus described in the Background section, the inventors have found the following problem.

Figure 1:
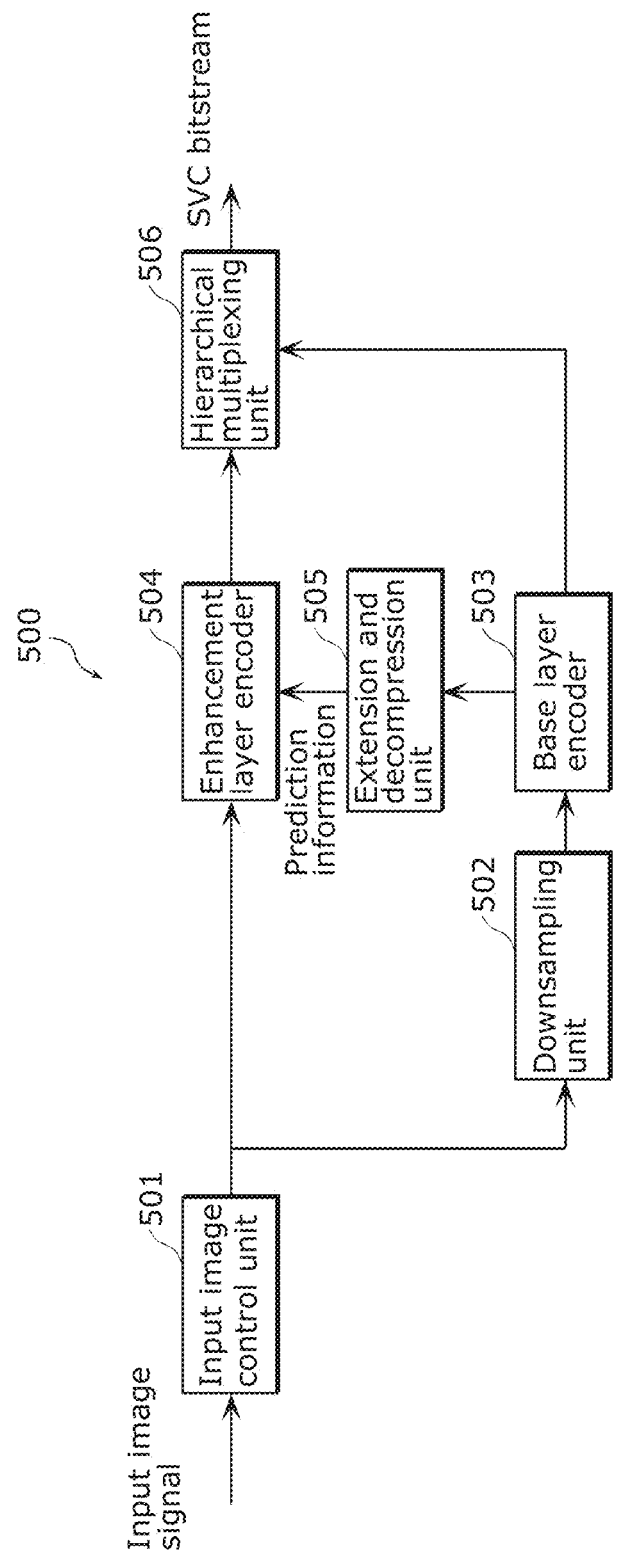
FIG. 1 is a block diagram showing a configuration of a spatially scalable image encoding apparatus in a moving picture encoding standard called H.264.

FIG. 1 is a block diagram showing a configuration of a spatially scalable image encoding apparatus in a moving picture encoding standard called H.264 that is already standardized.

A spatially scalable image encoding apparatus 500, as shown in FIG. 1, includes an input image control unit 501, a downsampling unit 502, a base layer encoder 503, an enhancement layer encoder 504, an extension and decompression unit 505, and a hierarchical multiplexing unit 506.

The input image control unit 501 transmits an input image signal to an encoder responsible for encoding each layer. The downsampling unit 502 generates an input image having a smaller resolution by performing downsampling on the input image signal. The base layer encoder 503 is a normal image encoding apparatus which does not perform spatially scalable encoding, and performs image encoding on a base layer. The extension and decompression unit 505 generates prediction information used for image encoding on the enhancement layer by extending or decompressing image encoding information of the base layer, and inputs it to the enhancement layer encoder 504. The enhancement layer encoder 504 performs image encoding on an input image signal (enhancement layer) inputted from the input image control unit 501 using the prediction information. The hierarchical multiplexing unit 506 multiplexes each layer, that is, encoding information of the base layer and the enhancement layer, and outputs a bitstream on which spatially scalable encoding is performed. It should be noted that although the spatially scalable image encoding apparatus shown in FIG. 1 has two layers of the base layer and the enhancement layer as an example, it is possible to implement spatially scalable image encoding on a plurality of enhancement layers by connecting the enhancement layer encoder 504 to multiple layers.

Figure 2:
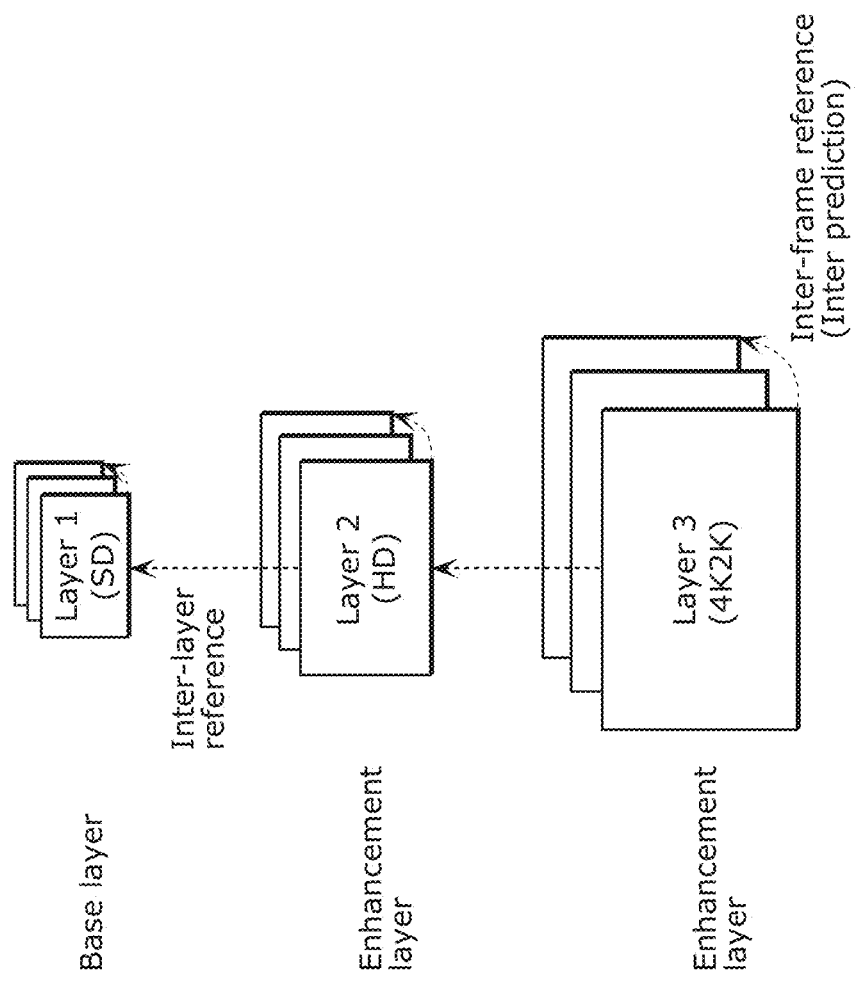
FIG. 2 is a diagram showing an example of an input image in an encoder for each layer in the spatially scalable image moving picture encoding apparatus.

FIG. 2 is a diagram showing an example of an input image in an encoder for each layer in the spatially scalable image encoding apparatus. The input image includes one base layer and two enhancement layers. The input image of the base layer (Layer 1) has an SD size, the input image of Layer 2 that is an enhancement layer has an HD size, and the input image of Layer 3 has a 4K2K size.

A layer having a relatively small resolution is called a lower layer, and a layer having a relatively large resolution is called an upper layer. In other words, the base layer is a lower layer at the lowermost layer. Spatially scalable encoding increases coding efficiency by performing inter-layer prediction using the prediction information of the lower layer when encoding is performed on an upper layer. The prediction information such as intra texture prediction, motion vector prediction, and inter frame difference prediction is used. It should be noted that using the prediction information of the lower layer when the upper layer is encoded is referred to as inter-layer reference (prediction). Also in spatially scalable image encoding, inter-frame prediction (inter prediction) in a temporal direction used in a normal image encoding is used. However, inter-frame reference relationship of the base layer must be the same for all the layers. A dashed line arrow in FIG. 2 shows inter-layer prediction and inter prediction. This shows that the image at the start of the arrow refers to the image at the end of the arrow as reference information. Since inter prediction of the base layer refers to a frame which is located two frames before, the inter prediction of the base layer refers to a frame which is located two frames before in the enhancement layer. It should be noted that whether or not inter-layer prediction is performed is switched by a block-by-block basis.

Figure 3:
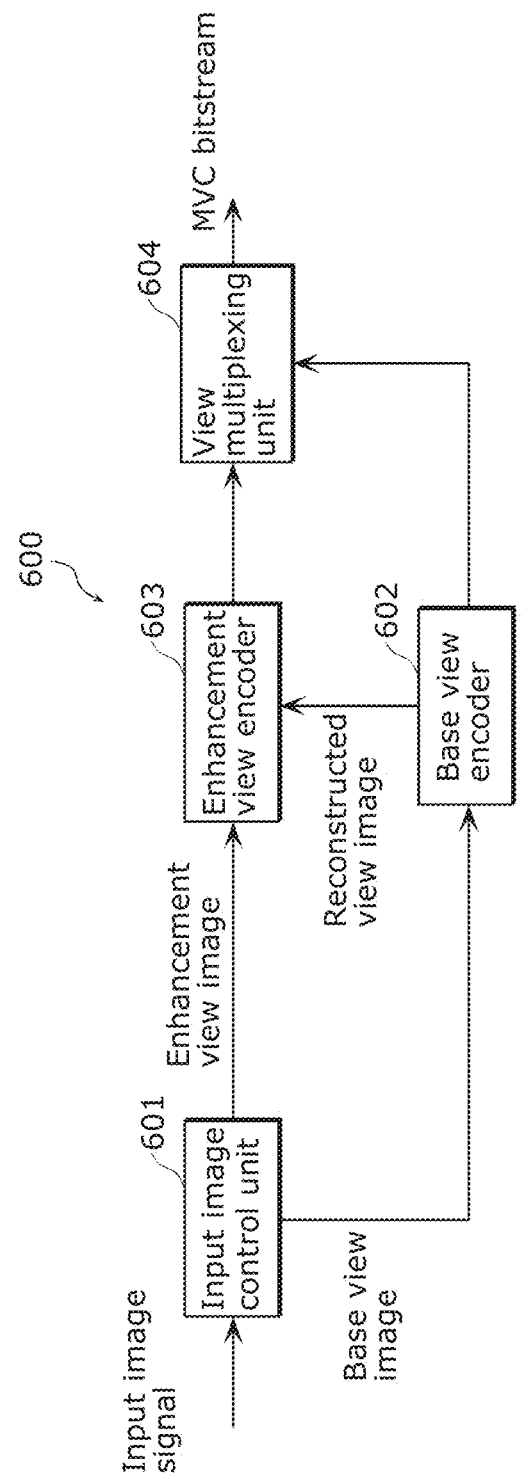
FIG. 3 is a block diagram showing a configuration of a multiview image encoding apparatus in a moving picture encoding standard called H.264.

FIG. 3 is a block diagram showing a configuration of a multiview image encoding apparatus in a moving picture encoding standard called H.264 that is already standardized.

A multiview image encoding apparatus 600 as shown in FIG. 3 includes an input image control unit 601, a base view encoder 602, an enhancement view encoder 603, and a view multiplexing unit 604.

The input image control unit 601 generates each view image from an input image signal where appropriate, and transmits it to an encoder for each view corresponding to one of the view images. It should be noted that an input image signal for each view may be inputted to the input image control unit 601. The base view encoder 602 is a normal image encoding apparatus which does not perform multiview encoding, and performs image encoding on a base view. Moreover, the base view encoder 602 inputs, to the enhancement view encoder 603, a reconstructed view image of the base view which is encoded and decoded in the base view encoder 602. The enhancement view encoder 603 performs image encoding on an enhancement view image inputted from the input image control unit 601 using the reconstructed view image. The view multiplexing unit 604 multiplexes each view, that is, encoding information of the base view and the enhancement view, and outputs a bitstream on which multiview encoding is performed. It should be noted that although the multiview image encoding apparatus shown in FIG. 3 includes two layers of the base layer and the enhancement layer, it is possible to implement multiview encoding on a plurality of enhancement views by connecting the enhancement view encoder 603 to multiplex layers.

Figure 4:
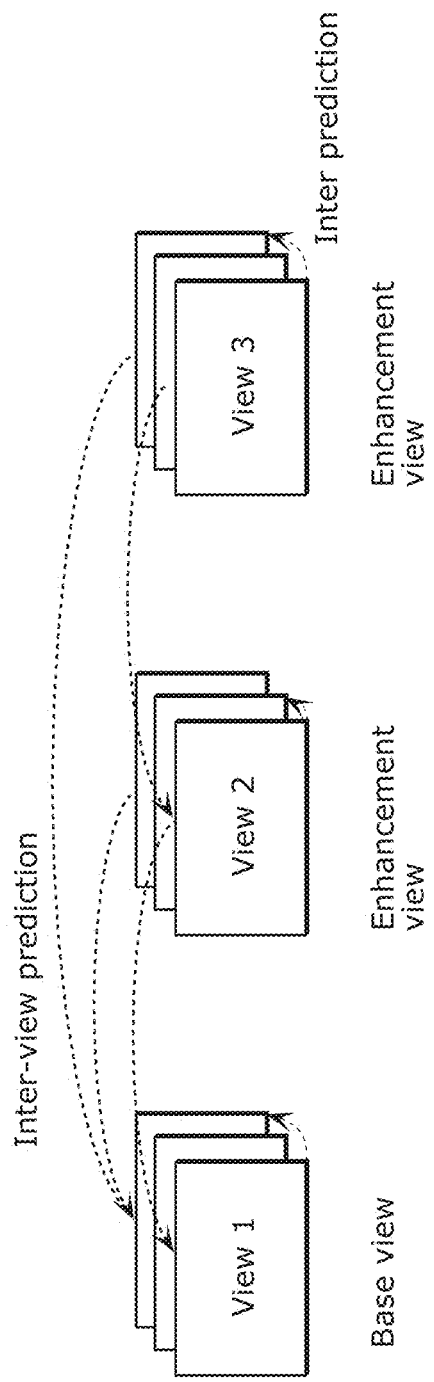
FIG. 4 is a diagram showing an example of an input image for each view in the multiview image encoding apparatus.

FIG. 4 shows an example of an input image for each view in the multiview image encoding apparatus. The input image includes one base view and two enhancement views. The image resolution is the same for the base view (View 1) and the enhancement views (View 2, View 3). Generally, each view is an image which is captured at the same time from a slightly different viewpoint, and the views have a correlation with each other. It is currently used as an encoding method for a stereoscopic image (3D).

Multiview image encoding increases coding efficiency by performing inter-layer prediction using a reconstructed image of the other view as a reference image when encoding is performed on an enhancement view. It should be noted that using a reconstructed image of the other view when an enhancement view is encoded is referred to as inter-view reference (prediction). In multiview image encoding, a reconstructed image of the other view is used as a reference image of inter-frame prediction (inter prediction) in a temporal direction used in a normal image encoding. However, a reconstructed image of the other view temporally different from the current image to be encoded cannot be used as a reference image.

When inter-view prediction is used, a referred view is selected. A dashed line arrow in FIG. 4 shows inter-view prediction and inter prediction. The inter-view prediction of the enhancement view (View 2) refers to the base view (View 1). Meanwhile, the inter-view prediction of the enhancement view (View 3) refers to the enhancement view (View 2). It should be noted that whether or not inter-view prediction is performed is switched by a block-by-block basis. Moreover, when the time is different, the inter-view reference relationship may be different.

When encoding is performed by a combination of the above described spatially scalable image encoding and multiview image encoding, the inter-layer reference and the inter-view reference are performed on the enhancement layer of the enhancement view. The enhancement layer of the enhancement view cannot be decoded until the enhancement layer of the base view and the lower layer of the enhancement view are decoded, the load of decoding process is high, and decoding efficiency is low.

The following will describe embodiments with reference to the drawings.

It should be noted that the following embodiments are general or specific examples. The numerical values, shapes, materials, structural elements, the arrangement and connection of the structural elements, steps, the processing order of the steps etc, shown in the following exemplary embodiments are mere examples, and therefore do not limit the scope of the present invention. Therefore, among the structural elements in the following exemplary embodiments, structural elements not recited in any one of the independent claims indicating the most generic concept are described as arbitrary structural elements.

Embodiment 1

Figure 5:
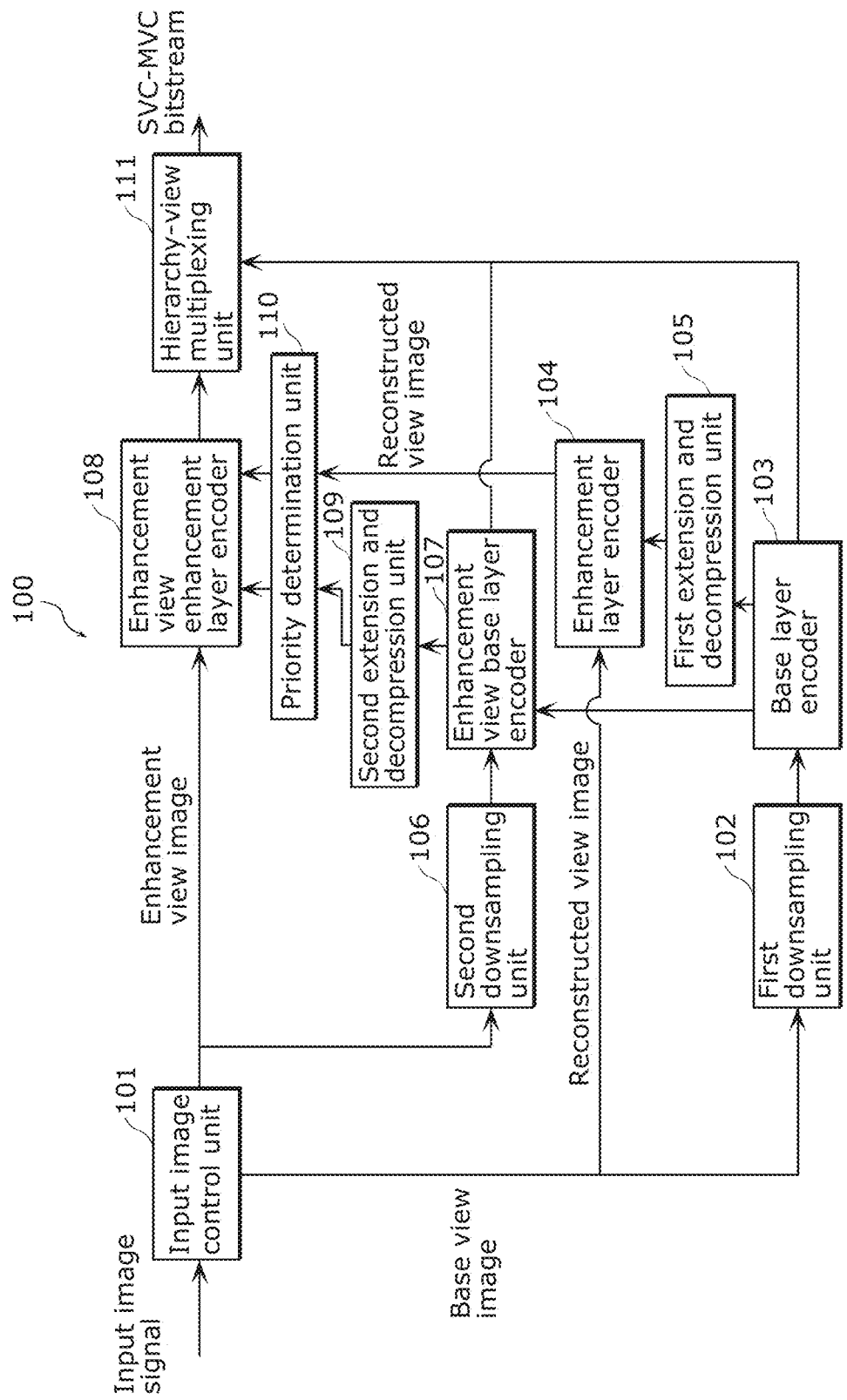
FIG. 5 is a block diagram showing a configuration, according to one embodiment, a spatially scalable-multiview moving picture encoding apparatus using a moving picture encoding method according to the present invention.

FIG. 5 is a block diagram showing a configuration, according to one embodiment, a spatially scalable-multiview moving picture encoding apparatus using a moving picture encoding method according to the present invention.

The spatially scalable-multiview moving picture encoding apparatus 100, as shown in FIG. 5, includes an input image control unit 101, a first downsampling unit 102, a base layer encoder 103, an enhancement layer encoder 104, a first extension and decompression unit 105, a second downsampling unit 106, an enhancement view base layer encoder 107, an enhancement view enhancement layer encoder 108, a second extension and decompression unit 109, a priority determination unit 110, and a hierarchy-view multiplexing unit 111. It should be noted that the first downsampling unit 102 and the second downsampling unit 106, and the first extension and decompression unit 105 and the second extension and decompression unit 109 have the same functions, respectively, and can be implemented for common use.

It should be noted that although the spatially scalable-multiview moving picture encoding apparatus shown in FIG. 5 includes two layers of the base layer and the enhancement layer, it is possible to implement multiview encoding on a plurality of enhancement views by connecting the enhancement view encoder (the enhancement view base layer encoder 107 and the enhancement view enhancement layer encoder 108) to multiplex layers. Similarly, although the hierarchy includes two layers of the base layer and the enhancement layer, it is possible to implement spatially scalable image encoding on a plurality of enhancement layers by connecting the enhancement layer encoder 104 and the enhancement view enhancement layer encoder 108 to multiple layers.

The input image control unit 101 demultiplexes an input image signal for each view, and transmits it to an encoder responsible for encoding each view.

The first downsampling unit 102 (the second downsampling unit 106) generates an input image having a smaller resolution by performing downsampling on the input image signal.

The base layer encoder 103 is a normal image encoding apparatus which does not perform spatially scalable encoding, and performs image encoding on the base layer of the base view. Then, a reconstructed view of the base layer of the base view is inputted to the enhancement view base layer encoder 107.

The extension and decompression unit 105 generates prediction information used for image encoding on the enhancement layer by extending or decompressing image encoding information of the base layer, and inputs it to the enhancement layer encoder 104.

The enhancement layer encoder 104 performs image encoding on an input image signal (enhancement layer of base view) inputted from the input image control unit 101 using the prediction information. Then, a reconstructed image of the enhancement layer of the base view is inputted to the priority determination unit 110.

The enhancement view base layer encoder 107 performs image encoding on the base layer of the enhancement view using a reconstructed image of the base layer of the base view which is reconstructed by the base layer encoder 103.

The second extension and decompression unit 109 generates prediction information used in image encoding on the enhancement layer of the enhancement view by extending or decompressing the image encoding information of the base layer of the enhancement view, and then inputs it to the priority determination unit 110.

The priority determination unit 110 determines a priority of the inter-layer reference and the inter-view reference, and transmits the determined priority prediction information to the enhancement view enhancement layer encoder 108.

The enhancement view enhancement layer encoder 108 performs image encoding on an input image signal (enhancement view of enhancement layer) inputted from the input image control unit 101 using the prediction information transmitted from the priority determination unit 110.

The hierarchy-view multiplexing unit 111 multiplexes encoding information transmitted from each encoder, that is, the base layer encoder 103, the enhancement layer encoder 104, the enhancement view base layer encoder 107, and the enhancement view enhancement layer encoder 108, and then outputs a bitstream on which spatially scalable image encoding and multiview image encoding are performed (hereinafter, referred to as SVC-MVC bitstream).

Figure 6A:
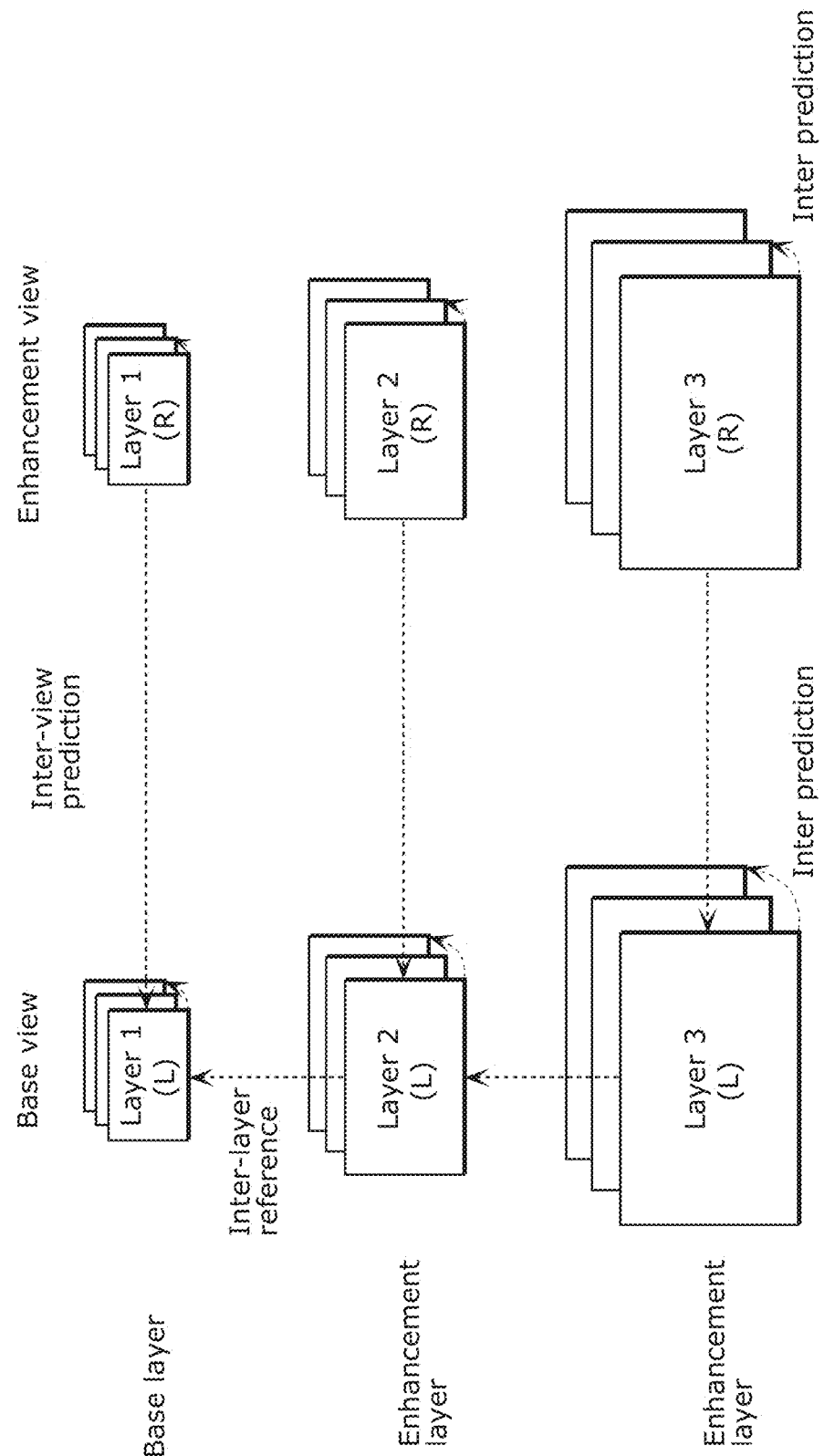
FIG. 6A is a diagram showing a prediction structure of an input image in pattern 1.

Next, priority determined by the priority determination unit 110 will be described. The priority has three patterns. Pattern 1 prioritizes inter-view reference. In this case, inter-layer reference is prohibited, and prediction information for the inter-layer reference is not transmitted to the enhancement view enhancement layer encoder 108. Therefore, the inter-view reference is only performed on the enhancement layer of the enhancement view. In other words, a reconstructed image of the base layer of the enhancement view generated by the enhancement view base layer encoder 107 is not inputted to the enhancement view enhancement layer encoder 108. FIG. 6A is a diagram showing a prediction structure of an input image in pattern 1. For simplification of explanation, a hierarchy has three layers and a view has two views (3D). Assume that a left view is a base layer and a right view is an enhancement view. The base layer of the base view (Layer 1 (L)) can be used only for inter prediction. The enhancement layer of the base view (Layer 2 (L), Layer 3 (L)) can be used for inter-layer prediction and inter prediction. The base layer of the enhancement view (Layer 1 (R)) can be used for inter-view prediction or inter prediction. The enhancement layer of the enhancement view (Layer 2 (R), Layer 3 (R)) can be used for inter-view prediction or inter prediction. Pattern 2 prioritizes inter-layer reference. In this case, inter-view reference is prohibited, and prediction information for the inter-view reference (reconstructed image of the reference view) is not transmitted to the enhancement view enhancement layer encoder 108. Therefore, the inter-layer reference is only performed on the enhancement layer of the enhancement view. FIG. 6B is a diagram showing a prediction structure of an input image in pattern 2. The prediction structure is the same as that of FIG. 6A excluding the enhancement layer of the enhancement view. The enhancement layer of the enhancement view (Layer 2 (R), Layer 3 (R)) can be used for inter-layer prediction and inter prediction.

Pattern 3 equally prioritizes inter-view reference and inter-layer reference. In this case, the prediction information for inter-layer reference and the prediction information for inter-view reference (a reconstructed image of the reference view) are both transmitted to the enhancement view enhancement layer encoder 108. Therefore, inter-view reference and inter-layer reference are performed on the enhancement layer of the enhancement view. FIG. 6C is a diagram showing a prediction structure of an input image in pattern 3. The prediction structure is the same as that of FIG. 6A excluding the enhancement layer of the enhancement view. The enhancement layer of the enhancement view (Layer 2 (R), Layer 3 (R)) can be used for inter-layer prediction and inter prediction, or inter-layer prediction or inter prediction.

By including the determined priority (any of pattern 1 to pattern 3) in a sequence parameter set (SPS), the decoder side is able to know a reference method used for prediction of the enhancement layer of the enhancement view. Moreover, by setting pattern 1 to a default, the priority determination unit 110 may not include priority in SPS when using pattern 1.

FIG. 7 shows a process flow by the spatially scalable-multiview moving picture encoding apparatus.

The priority determination unit 110 determines priority (step S101). It should be noted that the priority determination unit 110 can determine priority based on various viewpoints such as communication state and operation resource of encoder and decoder. The determined priority is set to a sequence parameter set (SPS) (step S102). It should be noted that when the priority is changed in the middle of the sequence, not only SPS but also another parameter such as a picture parameter set (PPS) can be set. When the input image to be encoded is an enhancement view and an enhancement layer (Yes in step S103), the priority determination unit 110 transmits, according to the priority determined by the priority determination unit 110, prediction information to the enhancement view enhancement layer encoder 108 (step S104). When inter-view reference is prioritized, the prediction information for inter-view reference (a reconstructed image of the reference view) is transmitted to the enhancement view enhancement layer encoder 108. The enhancement view enhancement layer encoder 108 performs inter-view prediction or inter prediction (step S105). When inter-layer reference is prioritized, the prediction information for inter-layer reference is transmitted to the enhancement view enhancement layer encoder 108. The enhancement view enhancement layer encoder 108 performs inter-layer prediction and inter prediction (step S106). When the priority is the same for inter-view reference and inter-layer reference, the prediction information for inter-layer reference and the prediction information for inter-view reference (a reconstructed image of the reference view) are both transmitted to the enhancement view enhancement layer encoder 108. The enhancement view enhancement layer encoder 108 performs inter-layer prediction and inter prediction, or inter-layer prediction or inter prediction (step S107).

When the input image to be encoded is not an enhancement view and an enhancement layer (No in step S103), a normal prediction encoding is performed (step S108). In other words, inter prediction encoding is performed on a base layer of a base view, inter-layer prediction and inter prediction encoding are performed on an enhancement layer of a base view, and inter-view prediction or inter prediction encoding is performed on a base layer of an enhancement view.

When a reference method used in prediction of an enhancement layer of an enhancement view in SVC-MVC bitstream can be found in advance, decoding efficiency increases. For example, by knowing that the prediction structure of pattern 1 shown in FIG. 6A is used when the decoder side decodes and displays Layer 3 (R) that is an enhancement layer of an enhancement view, the decoder can not only decode the images of Layer 1 (L), Layer 2 (L), and Layer 3 (L) but also the image of Layer 3 (R). Similarly, by knowing that the prediction structure of pattern 2 shown in FIG. 6B is used, the decoder can decode the image of Layer 3 (R) by only decoding the images of Layer 1 (L), Layer 1 (R), and Layer 2 (R) and without decoding the images of Layer 2 (L) and Layer 3 (L).

As described above, according to the present embodiment, by determining the priority of inter-layer reference and inter-view reference, decoding efficiency on the decoder side is increased.

Figure 8B:
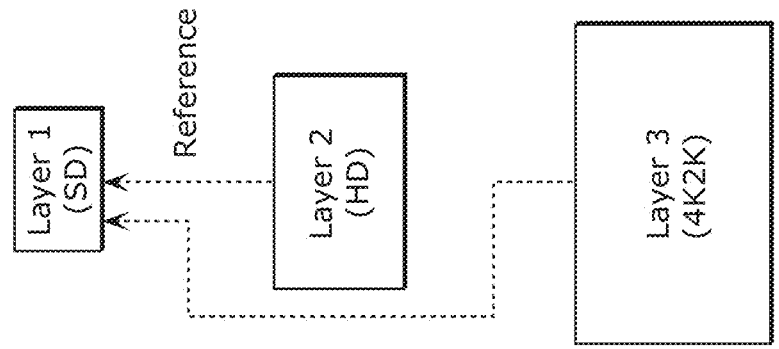
FIG. 8B is a diagram showing a prediction structure of an input image in inter-layer prediction according to Embodiment 1.
Figure 8A:
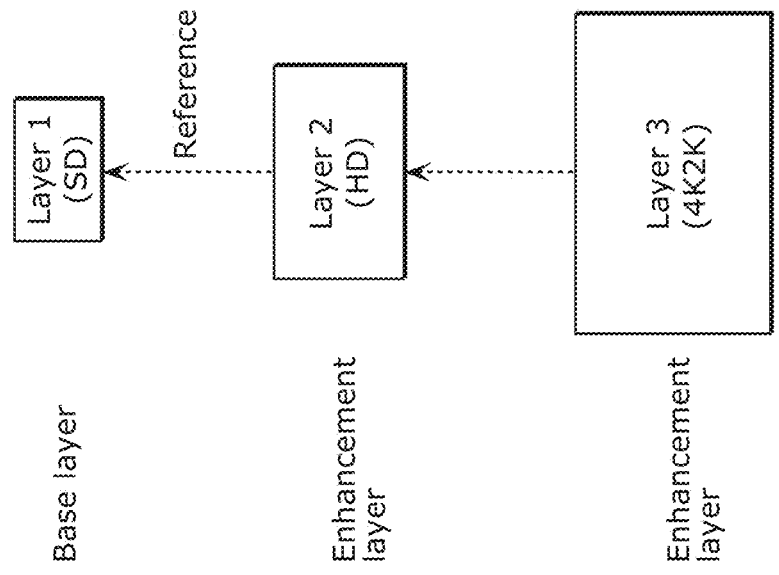
FIG. 8A is a diagram showing a prediction structure of an input image in inter-layer prediction according to Embodiment 1.

FIGS. 8A and 8B are each a diagram showing a prediction structure of an input image in inter-layer prediction according to the present embodiment. The prediction structure in FIG. 8A is the same as that used for the conventional spatially scalable encoding shown in FIG. 2. In other words, the first enhancement layer (Layer 2) uses the prediction information of the base layer (Layer 1) for inter-layer prediction. In other words, the second enhancement layer (Layer 3) uses the prediction information of the first enhancement layer (Layer 1) for inter-layer prediction. In other words, the enhancement layer refers to an enhancement layer which is lower by one layer. This prediction structure is called a sequential prediction structure. Conversely, the prediction structure shown in FIG. 8B uses not the first enhancement layer (Layer 2) but the prediction information of the base layer (Layer 1) for inter-layer prediction. In other words, all the enhancement layers use the prediction information of the base layer (Layer 1) for inter-layer prediction. This prediction structure is called a star prediction structure. When the star prediction structure is used, the total amount of encoded bits of all the layers tends to increase compared with the case where a sequential prediction structure is used. However, since the decoding process on an upper layer can be started after decoding the base layer, decoding efficiency is high. Although not illustrated, by generalizing the prediction structure shown in FIGS. 8A and 8B, all the enhancement layers may refer to any enhancement layer or base layer in the lower layers. In that case, for example, when the enhancement layer has three layers, the prediction structure has six types including the sequential prediction structure and the star prediction structure. In place of the sequential prediction structure and the star prediction structure, generalized prediction structure may be used.

By including the determined prediction structure (sequential prediction structure, star prediction structure, and the like) in supplemental enhancement information (SEI) and transmitting the SEI message to the decoder side, the decoder side is able to know the prediction structure used for inter-layer prediction. Moreover, by setting the sequential prediction structure to a default, the encoder may not transmit the prediction structure of inter-layer prediction when using the sequential prediction structure.

A non-illustrated prediction structure control unit of the spatially scalable-multiview moving picture encoding apparatus according to the present embodiment controls such that the prediction structure of inter-layer reference of the base view matches with the prediction structure of inter-layer reference of the enhancement view. Specifically, the prediction structure of inter-layer reference of the enhancement view is controlled for matching with the prediction structure of inter-layer structure of the base view. As a result, as shown in FIG. 6B and FIG. 6C, inter-layer reference of the base view and inter-layer reference of the enhancement view both use a sequential prediction structure. Moreover, when the star prediction structure is used for inter-layer reference of the base view, the star prediction structure is also used for inter-layer reference of the enhancement view. FIG. 9A is obtained by changing inter-layer reference to the star prediction structure in the prediction structure of the input image shown in FIG. 6C. The prediction structure control unit, as shown in FIG. 9A, controls the prediction structure of inter-layer reference of the enhancement view to match with the prediction structure of inter-layer structure of the base view.

Figure 9B:
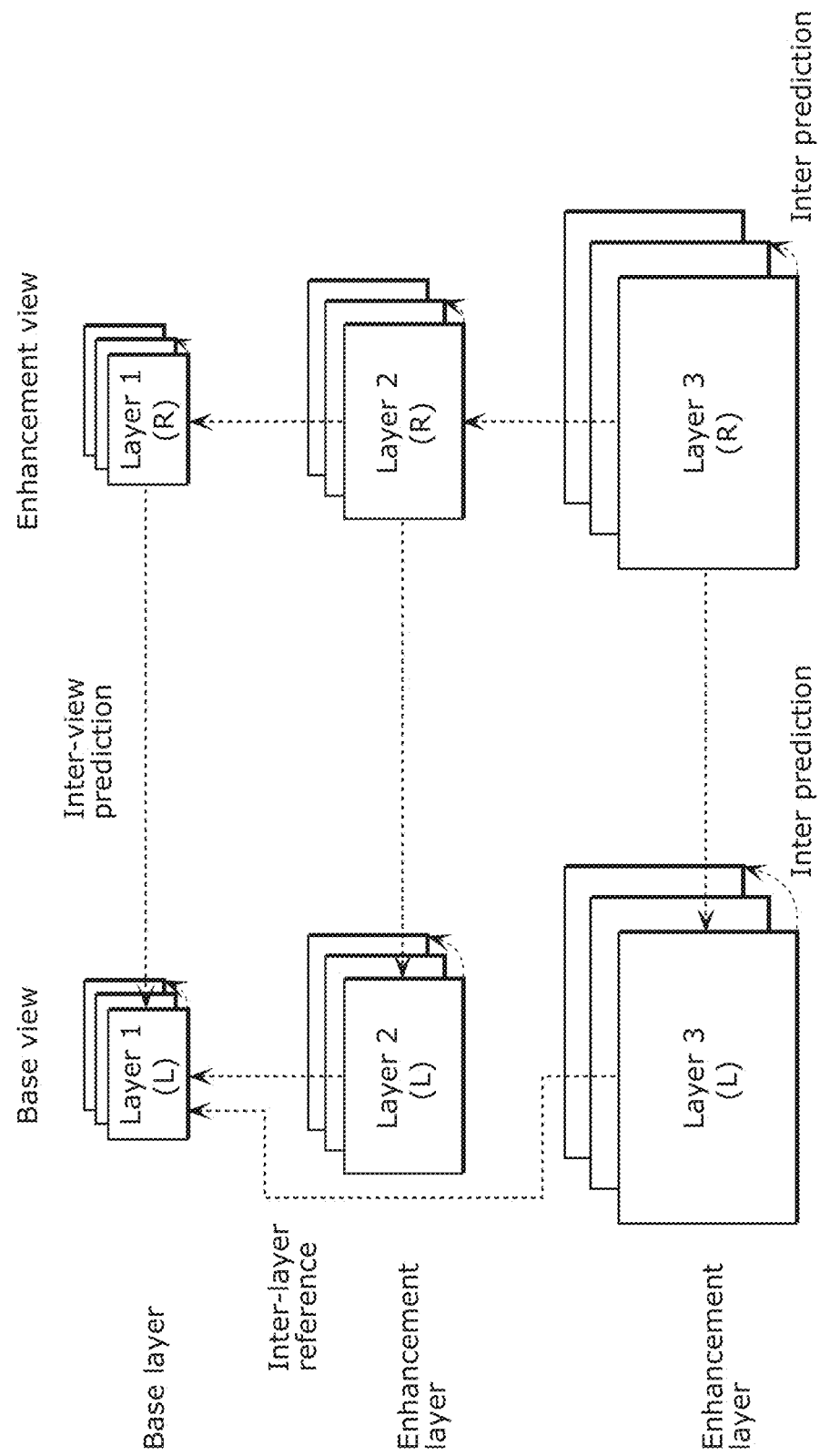
FIG. 9B is a diagram showing an example of a prediction structure of an input image.

When the non-illustrated prediction structure control unit controls in this way, decoding efficiency on the decoder side of SVC-MVC bitstream is increased. For example, when the prediction structure shown in FIG. 9A is used in the case where the decoder side decodes and displays Layer 3 (R) that is an enhancement layer of the enhancement view, the decoder can decode the image of Layer 3 (R) by only decoding the images of Layer 1 (L), Layer 3 (L), and Layer 1 (R) and without decoding the images of Layer 2 (L) and Layer 2 (R). FIG. 9B shows a prediction structure in which the prediction structures of inter-layer reference for their respective views do not match with each other for comparison of decoding efficiency. The star prediction structure is used in the prediction structure of inter-layer reference of the base view, and the sequential prediction structure is used in the prediction structure of inter-layer reference of the enhancement view. The prediction structure of inter-layer reference of the enhancement view does not match with the prediction structure of inter-layer structure of the base view. At this time, when the decoder side decodes and displays Layer 3 (R) that is an enhancement view of an enhancement layer, all the images of Layer 1 (L), Layer 2 (L), Layer 3 (L), Layer 1 (R), and Layer 2 (R) must be decoded and thus decoding efficiency is significantly decreased.

According to the present embodiment, by controlling such that the prediction structure of inter-layer reference of the enhancement view matches with the prediction structure of inter-layer reference of the base view, decoding efficiency on the decoder side is increased.

It should be noted that a moving picture decoding apparatus and a moving picture decoding method according to the present embodiment does not have to include all configurations and steps shown in FIG. 5 or FIG. 7. In other words, a moving picture encoding apparatus according to one aspect of the present embodiment is a moving picture encoding apparatus which performs spatially scalable encoding on an input image including a base layer and one or more enhancement layers, and performs multiview image encoding on a base view and one or more enhancement views, and the moving picture encoding apparatus includes: a base layer encoder which encodes the base layer; an enhancement layer encoder which performs spatially scalable encoding on the enhancement layer using a reconstructed image of the base layer, the reconstructed image being generated by the base layer encoder; an enhancement view base layer encoder which performs multiview encoding on the base layer of the enhancement view using the reconstructed image of the base layer, the reconstructed image being generated by the base layer encoder; and an enhancement view enhancement layer encoder which performs multiview encoding on the enhancement layer of the enhancement view using a reconstructed image of the enhancement layer, the reconstructed image being generated by the enhancement layer encoder.

Moreover, in a moving picture decoding apparatus according to one aspect of the present embodiment, a reconstructed image of the base layer of the enhancement view may not be inputted to the enhancement view enhancement layer encoder, the reconstructed view being generated by the enhancement view base layer encoder.

Moreover, a moving picture decoding method according to one aspect of the present embodiment is a moving picture encoding method for performing spatially scalable encoding on an input image including a base layer and one or more enhancement layers, and performing multiview image encoding on a base view and one or more enhancement views, and the moving picture encoding method may include: encoding the base layer and generating a reconstructed image of the base layer; performing spatially scalable encoding on the enhancement layer using the reconstructed image of the base layer, and generating a reconstructed image of the enhancement layer; performing multiview encoding on the base layer of the enhancement view using the reconstructed image of the base layer; and performing multiview encoding on the enhancement layer of the enhancement view using the reconstructed image of the enhancement layer.

Embodiment 2

Figure 10:
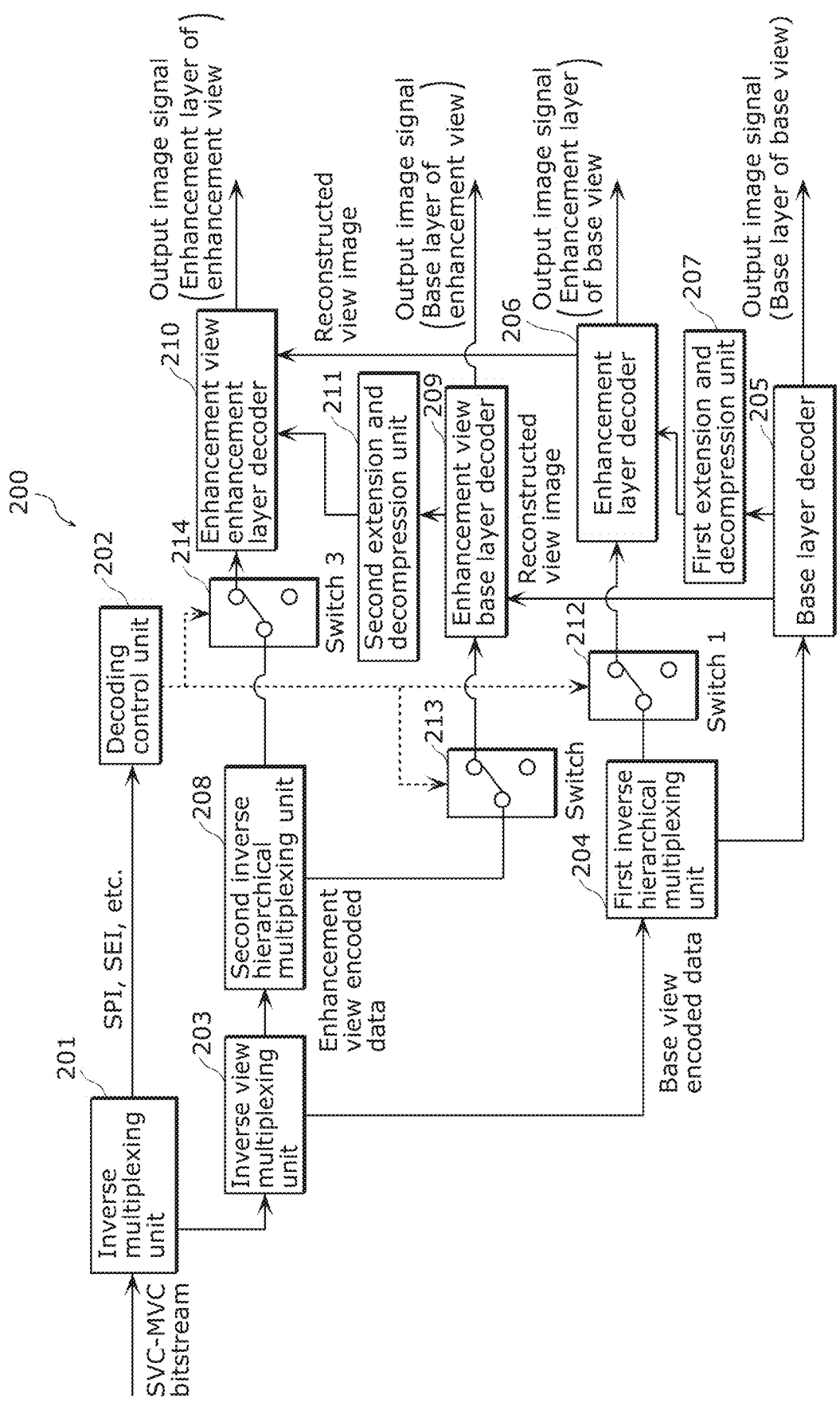
FIG. 10 is a block diagram showing a configuration according to one embodiment of a spatially scalable-multiview moving picture decoding apparatus which decodes SVC-MVC bitstream.

FIG. 10 is a block diagram showing a configuration according to one embodiment of a spatially scalable-multiview decoding apparatus which decodes a bitstream on which spatially scalable image encoding and multiview image encoding are performed (hereinafter, referred to as SVC-MVC bitstream).

A spatially scalable-multiview moving picture decoding apparatus 200, as shown in FIG. 10, includes an inverse multiplexing unit 201, a decoding control unit 202, an inverse view multiplexing unit 203, a first inverse hierarchical multiplexing unit 204, a base layer decoder 205, an enhancement layer decoder 206, a first extension and decompression unit 207, a second inverse hierarchical multiplexing unit 208, an enhancement view base layer decoder 209, an enhancement view enhancement layer decoder 210, a second extension and decompression unit 211, and switches 212, 213, and 214. It should be noted that the first inverse hierarchical multiplexing unit 204 and the second inverse hierarchical multiplexing unit 208, and the first extension and decompression unit 207 and the second extension and decompression unit 211 have the same functions, respectively, and can be implemented for common use.

It should be noted that although the spatially scalable-multiview moving picture encoding apparatus shown in FIG. 10 includes two layers of the base layer and the enhancement layer, it is possible to implement multiview image decoding on a plurality of enhancement views by connecting the enhancement view decoder (the enhancement view base layer decoder 209 and the enhancement view enhancement layer decoder 210) to multiplex layers. Similarly, although the hierarchy includes two layers of the base layer and the enhancement layer, it is possible to implement spatially scalable image decoding on a plurality of enhancement layers by connecting the enhancement layer decoder 206 and the enhancement view enhancement layer decoder 210 to multiple layers.

When SVC-MVC bitstream is inputted, the inverse multiplexing unit 201 demultiplexes it into video encoded data and additional information. The additional information includes information such as SPS and SEI, for example. It should be noted that SEI may have a configuration which receives separately from SVC-MVC bitstream. The inverse multiplexing unit 201 transmits video encoded data to the inverse view multiplexing unit 203, and transmits the additional information to the decoding control unit 202.

The decoding control unit 202 controls, based on the additional information, each units within the spatially scalable-multiview moving picture decoding apparatus. It should be noted that a control signal that the decoding control unit 202 uses in control is not illustrated with some exceptions.

The inverse view multiplexing unit 203 demultiplexes video encoded data on which multiview encoding is performed, into encoded data for each view (base view encoded data and enhancement view encoded data).

The first inverse hierarchical multiplexing unit 204 (second inverse multiplexing unit 208) demultiplexes encoded data for each layer (base layer encoded data and enhancement layer encoded data) from video encoded data on which hierarchical encoding is performed, and then transmits it to the decoder for each layer. It should be noted that the spatially scalable-multiview moving picture decoding apparatus according to the present embodiment has a configuration in which the inverse view multiplexing unit 203 demultiplexes in advance into encoded data for each view, and the inverse hierarchical multiplexing unit demultiplexes encoded data for each view into encoded data for each layer. However, the configuration is not limited to such. In other words, it is obvious to a person having ordinary skill in the art that it is configured such that the inverse hierarchical multiplexing unit demultiplexes in advance into encoded data for each layer, and the inverse view multiplexing unit 203 demultiplexes encoded data for each layer into encoded data for each view.

The base layer decoder 205 is a normal image decoding apparatus which does not perform spatially scalable image encoding, and performs image decoding on the base layer of the base view.

The first extension and decompression unit 207 generates prediction information used in image decoding of an enhancement layer by extending or decompressing image decoding information of the base layer, and inputs it to the enhancement layer decoder 206.

The enhancement layer decoder 206 performs image decoding on the enhancement layer of the base view using prediction information. Then, a reconstructed image of the enhancement layer of the base view is inputted to the enhancement view enhancement layer encoder.

The enhancement view base layer decoder 209 performs image decoding on the base layer the enhancement view using a reconstructed image of the base layer of the base view which is reconstructed by the base layer decoder 205.

The second extension and decompression unit 211 generates prediction information used in image decoding on the enhancement layer of the enhancement view by extending or decompressing image decoding information of the base layer of the enhancement view, and inputs it to the enhancement view enhancement layer decoder 210.

The switch (1) 212 is inserted between the first inverse hierarchical multiplexing unit 204 and the enhancement layer decoder 206, the switch (2) 213 is inserted between the second inverse hierarchical multiplexing unit 208 and the enhancement view base layer decoder 209, and the switch (3) 214 is inserted between the second inverse hierarchical multiplexing unit 208 and the enhancement view enhancement layer decoder 210. ON and OFF of a path in the switches 212, 213, and 214 are controlled by the decoding control unit 202. When OFF, data is not transmitted and then destroyed.

Figure 11:
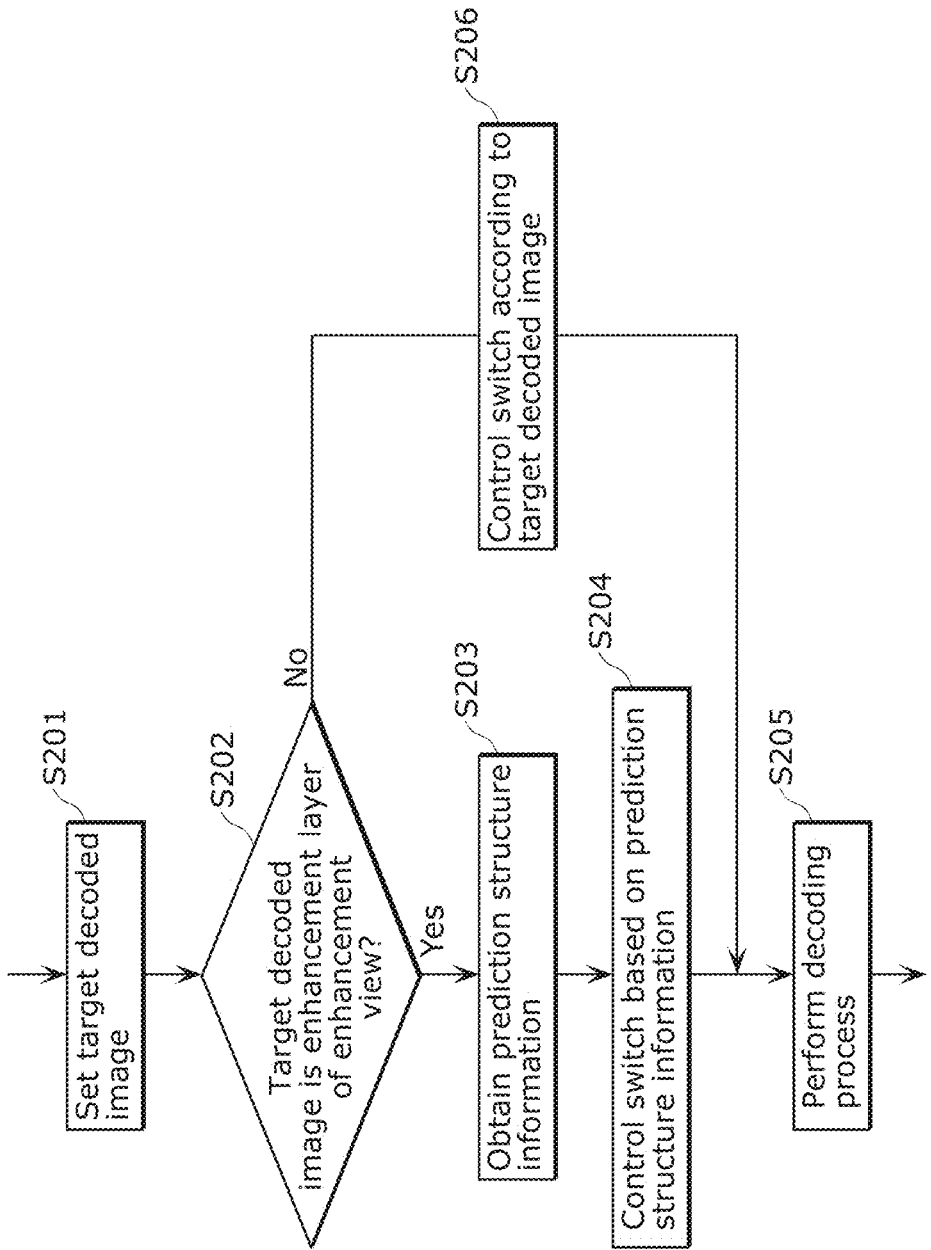
FIG. 11 is a diagram showing a process flow by the spatially scalable-multiview moving picture encoding apparatus.

FIG. 11 shows a process flow by the spatially scalable-multiview decoding apparatus.

First, a target decoded image is set (step S201). The target decoded image is an image that the spatially scalable-multiview moving picture decoding apparatus decodes and displays in a display apparatus that is not illustrated. Using an example shown in FIG. 6A, the SVC-MVC bitstream includes six encoded images, that is, Layer 1 (L), Layer 2 (L), Layer 3 (L), Layer 1 (R), Layer 2 (R), Layer 3 (R). However, usually, only a selected image is displayed in a display apparatus on the decoder side. The image selected from the six images is called a target decoded image. It should be noted that the selection of the target decoded image is performed by a user instruction, and may be determined based on communication state, operation resources on the decoder side, and a resolution of the display apparatus.

Next, the decoding control unit 202 determines whether or not the set target decoded image is an image of the enhancement layer of the enhancement view (Layer 2 (R), Layer 3 (R)) (step S202). When the target decoded image is an image of the enhancement layer of the enhancement view, the decoding control unit 202 obtains, from additional information, prediction structure information (priority information of inter-layer reference and inter-view reference) (step S203). Then, based on the prediction structure information, a switch is controlled (step S204). When the switch is controlled to be OFF, encoded data is not inputted to the encoder and then destroyed. It should be noted that the encoder to which encoded data is not inputted does not operate. The decoder to which encoded data is inputted performs decoding process on the inputted encoded data (step S206). Then, the only decoder which corresponds to the target decoded image outputs the decoded output image signal to a display apparatus that is not illustrated. It should be noted that when the decoding control unit 202 obtains, from additional information, new prediction structure information (step S203) after decoding process is performed on encoded data at a certain point of time (step S205), the process returns to step S204 and then the process of step S205 is repeated. For example, when the prediction structure is changed in the middle of sequence, new prediction structure information is included in a picture parameter set (PPS) that is one of the additional information items. In the subsequent sequence, decoding process is performed based on the obtained new prediction structure information.

When the target decoded image is not an image of the enhancement layer of the enhancement view, the decoding control unit 202 controls the switch according to the target decoded image (step S206). Specifically, when the target image is the base layer of the base view (Layer 1 (L)), the decoding control unit 202 controls all of the switch (1) 212 to the switch (3) 214 to be OFF. Moreover, when the target image is the enhancement layer of the base view (Layer 2 (L), Layer 3 (L)), the decoding control unit 202 controls the switch (2) 213 and the switch (3) 214 to be OFF. Moreover, when the target image is the base layer of the enhancement view (Layer 1 (R)), the decoding control unit 202 controls the switch (1) 212 and the switch (3) 214 to be OFF.

Next, a specific operation of step S204 (control of the switch based on the prediction information structure) will be described. The prediction structure information of the input image, as described in Embodiment 1, is information indicating prediction structure in pattern 1 to pattern 3 shown in FIG. 6A to FIG. 6C. The target decoded image is determined to be Layer 3 (R) that is an image of the enhancement layer of the enhancement view. In the case of the prediction structure in FIG. 6A, the decoding control unit 202 turns ON the switch (1) 212. With this, the base view enhancement layer decoder operates, and then decodes encoded data of Layer 3 (L). Meanwhile, the decoding control unit 202 turns OFF the switch (2) 213. With this, encoded data of Layer 1 (R) is destroyed, and therefore the enhancement view base layer decoder 209 does not operate. Furthermore, the decoding control unit 202 turns OFF the switch (3) 214. With this, encoded data of Layer 2 (R) is destroyed, and therefore the enhancement view enhancement layer decoder 210 does not operate. It should be noted that the decoding control unit 202 controls, to be ON, the non-illustrated switch connected to the non-illustrated enhancement view enhancement layer decoder which decodes encoded data of Layer 3 (R). With this, the non-illustrated enhancement view enhancement layer decoder operates, and encoded data of Layer 3 (R) is decoded based on reconstructed Layer 3 (L). In the case of the prediction structure in FIG. 63, the decoding control unit 202 controls the switch (2) 213 and the switch (3) 214 to be ON. With this, the enhancement view base layer decoder 209 operates, and encoded data of Layer 1 (R) is decoded based on reconstructed Layer 1 (L). Then, the enhancement view enhancement layer decoder 210 operates, and then encoded data of Layer 3 (R) is decoded. Meanwhile, the decoding control unit 202 turns OFF the switch (1) 212 to be OFF. With this, encoded data of Layer 2 (L) and Layer 3 (L) are destroyed, and therefore the base view enhancement layer decoder does not operate.

As described above, according to the present embodiment, since decoding process on an image in which the target decoded image does not have to be decoded is skipped by performing decoding control based on the prediction information structure, decoding efficiency is increased.

It should be noted that a moving picture decoding apparatus and a moving picture decoding method according to the present embodiment does not have to include all configurations and steps shown in FIG. 10 or FIG. 11. In other words, a moving picture decoding apparatus according to one aspect in the present embodiment is a moving picture decoding apparatus which decodes encoded data obtained by (i) performing spatially scalable encoding on an input image including a base layer and one or more enhancement layers, and (ii) performing multiview image encoding on one or more enhancement views each using one of the base layer and the enhancement layer as a base view, and the moving picture decoding apparatus may include: a base layer decoder which decodes the base layer; and an enhancement layer decoder which performs spatially scalable decoding on an enhancement layer using a reconstructed image of the base layer, the reconstructed image being generated by the base layer decoder.

Moreover, a moving picture decoding apparatus according to one aspect of the present embodiment is a moving picture decoding apparatus which decodes encoded data obtained by (i) performing spatially scalable encoding on an input image including a base layer and one or more enhancement layers, and (ii) performing multiview image encoding on one or more enhancement views each using one of the base layer and the enhancement layer as a base view, and the moving picture decoding apparatus may include: a base layer decoder which decodes the base layer; and an enhancement view base layer decoder which performs multiview decoding on the base layer of the enhancement layer using a reconstructed image of the base layer, the reconstructed image being generated by the base layer decoder.

Moreover, a moving picture decoding apparatus according to one aspect in the present embodiment is a moving picture decoding apparatus which decodes encoded data obtained by (i) performing spatially scalable encoding on an input image including a base layer and one or more enhancement layers, and (ii) performing multiview image encoding on one or more enhancement views each using one of the base layer and the enhancement layer as a base view, and the moving picture decoding apparatus may include: a base layer decoder which decodes the base layer; an enhancement view base layer decoder which performs multiview decoding on the base layer of the enhancement layer using a reconstructed image of the base layer, the reconstructed image being generated by the base layer decoder; and an enhancement view decoder which performs multiview decoding on the base layer of the enhancement view using a reconstructed image of the base layer, and performs multiview decoding on the enhancement layer of the enhancement view using a reconstructed image of the enhancement layer, the reconstructed image of the base layer and the reconstructed image of the enhancement layer being generated by the base layer decoder and the enhancement layer decoder, respectively.

Moreover, a moving picture decoding method according to one aspect in the present embodiment is a moving picture decoding method for decoding encoded data obtained by (i) performing spatially scalable encoding on an input image including a base layer and one or more enhancement layers, and (ii) performing multiview image encoding on one or more enhancement views each using one of the base layer and the enhancement layer as a base view, and the moving picture decoding method may include: decoding the base layer and generating a reconstructed image of the base layer; and performing spatially scalable decoding on the enhancement layer using the reconstructed image of the base layer.

Moreover, a moving picture decoding method according to one aspect in the present embodiment is a moving picture decoding method for decoding encoded data obtained by (i) performing spatially scalable encoding on an input image including a base layer and one or more enhancement layers, and (ii) performing multiview image encoding on one or more enhancement views each using one of the base layer and the enhancement layer as a base view, and the moving picture decoding method may include: decoding the base layer and generating a reconstructed image of the base layer; and performing multiview decoding on the base layer of the enhancement view using the reconstructed image of the base layer.

Moreover, in a moving picture decoding method according to one aspect in the present embodiment is a moving picture decoding method for decoding encoded data obtained by (i) performing spatially scalable encoding on an input image including a base layer and one or more enhancement layers, and (ii) performing multiview image encoding on one or more enhancement views each using one of the base layer and the enhancement layer as a base view, and the moving picture decoding method may include: decoding the base layer and generating a reconstructed image of the base layer; performing spatially scalable decoding on the enhancement layer using the reconstructed image of the base layer, and generating a reconstructed image of the enhancement layer; performing multiview decoding on the base layer of the enhancement view using the reconstructed image of the base layer; and performing multiview decoding on the enhancement layer of the enhancement view using the reconstructed image of the enhancement layer.

Embodiment 3

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 12:
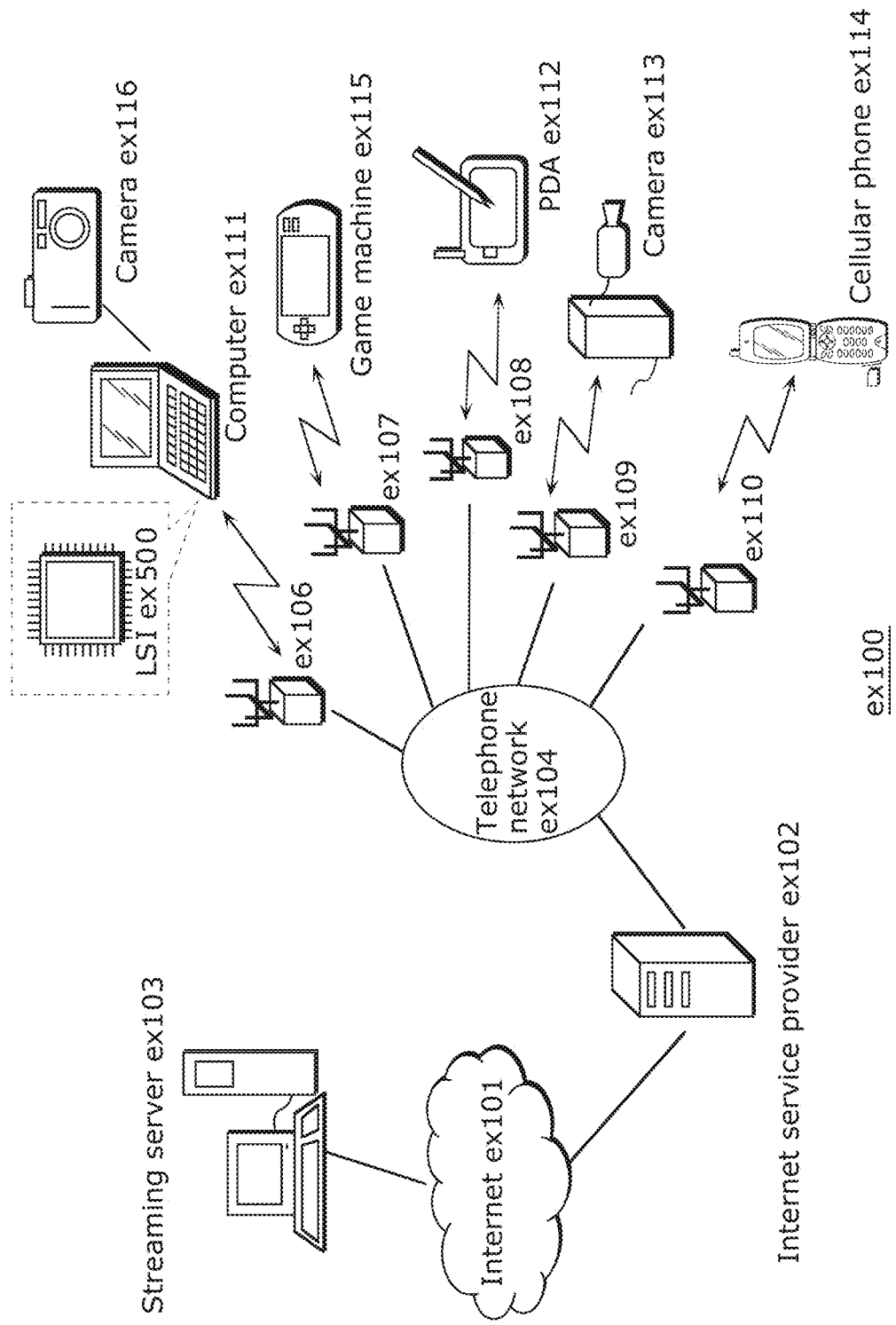
FIG. 12 shows an overall configuration of a content providing system for implementing content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present invention), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present invention).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
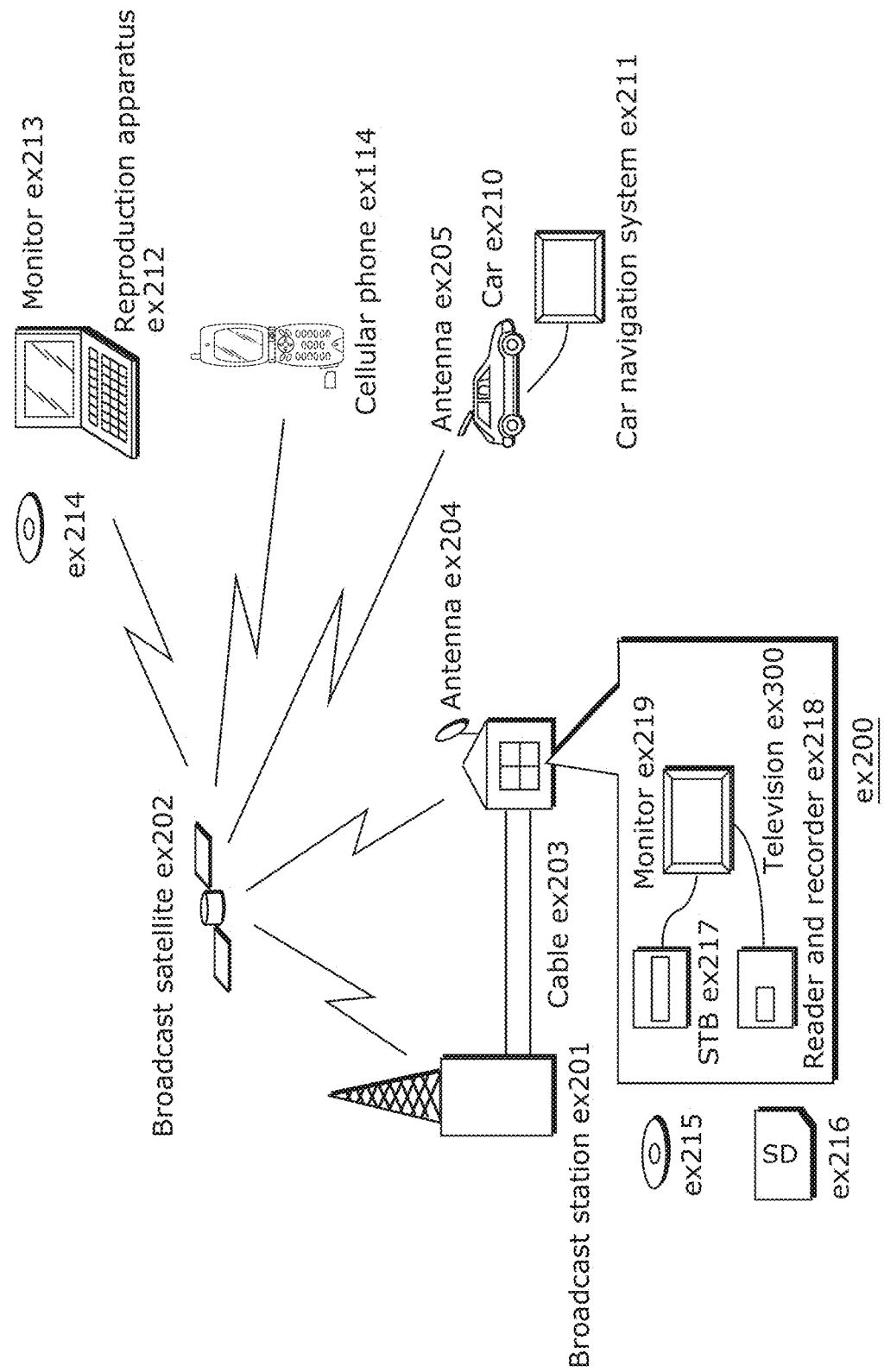
FIG. 13 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 14:
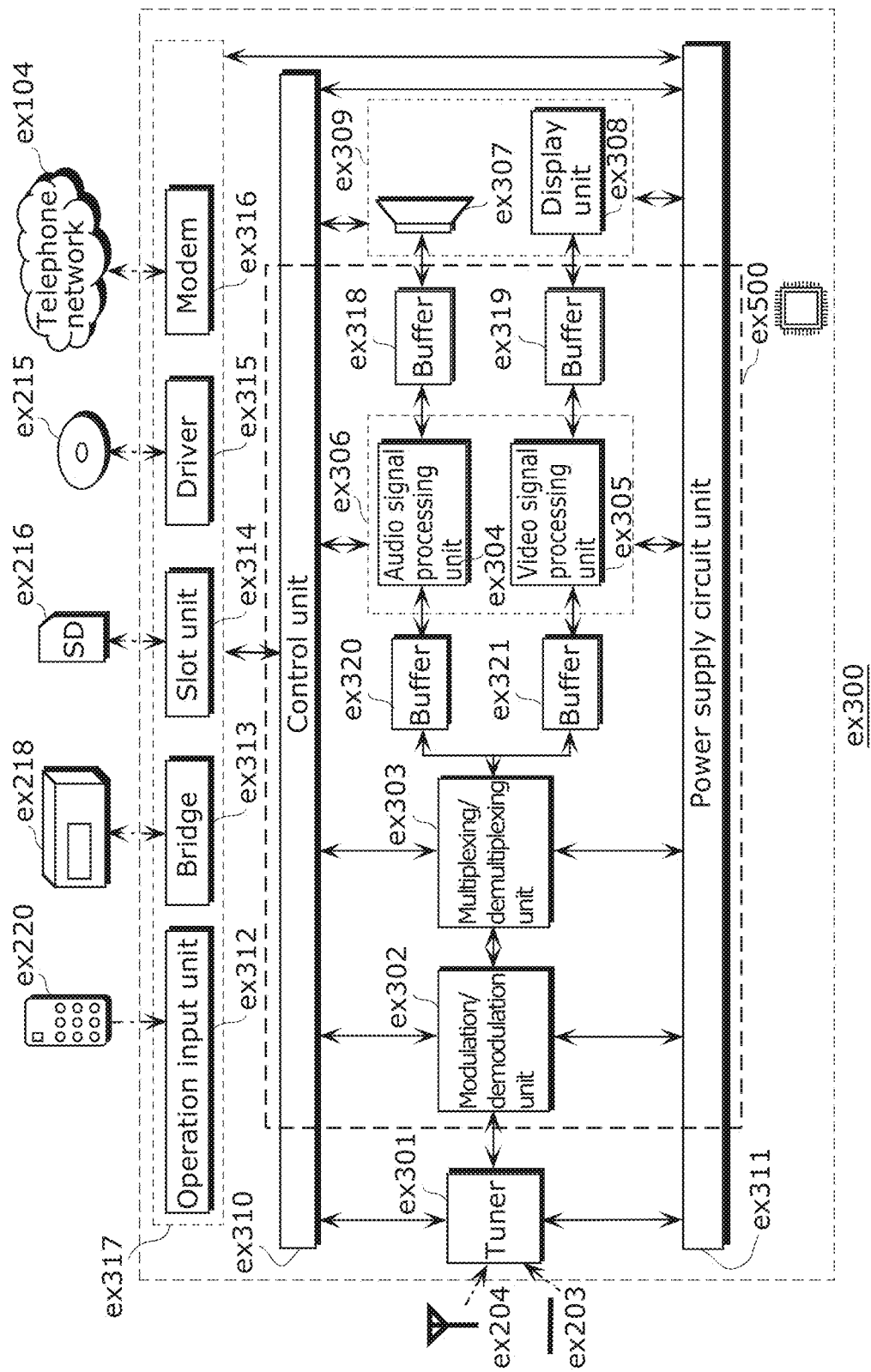
FIG. 14 shows a block diagram illustrating an example of a configuration of a television.

FIG. 14 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underfloor may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 15:
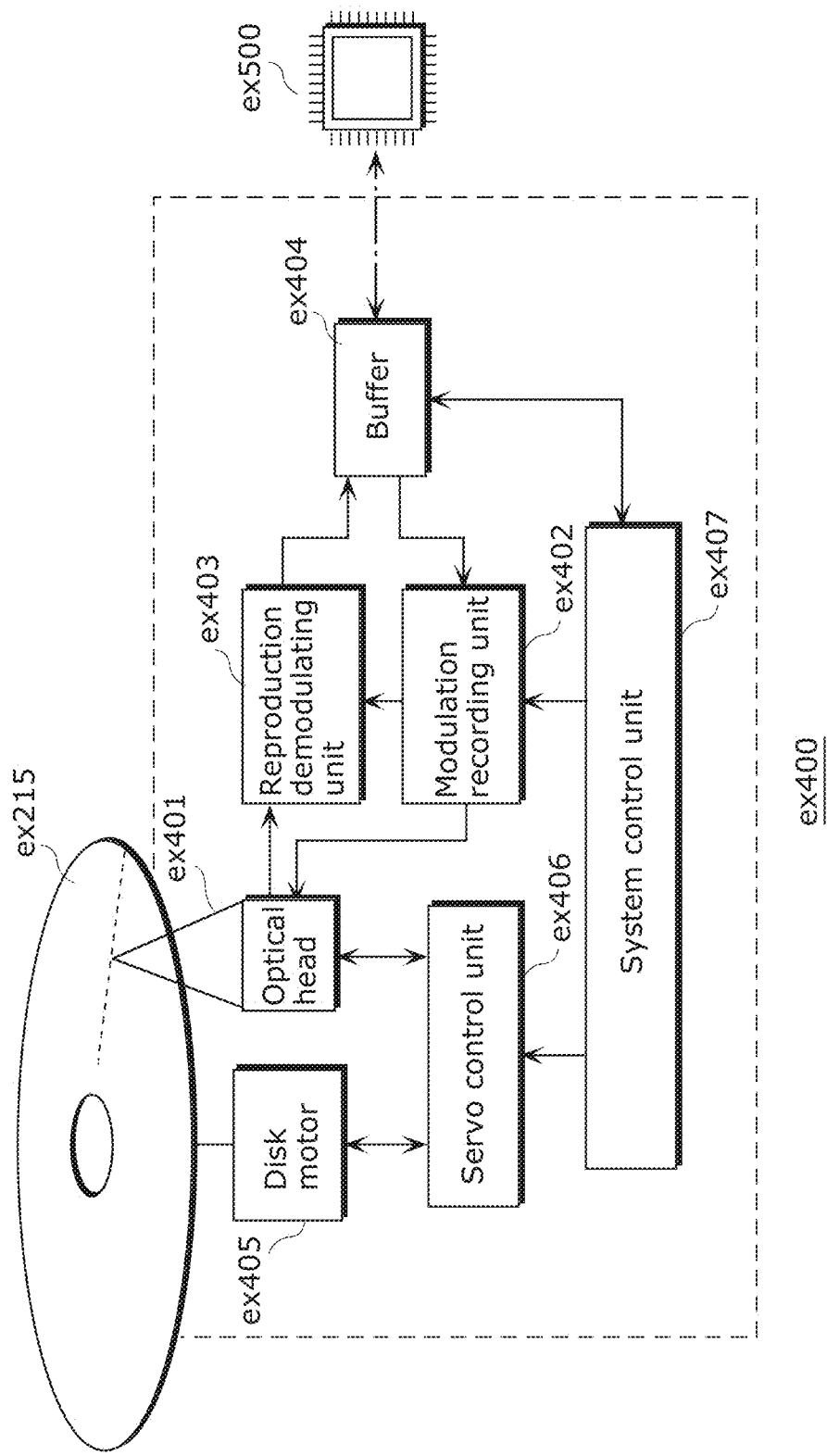
FIG. 15 shows a block diagram illustrating an example of a configuration of an information reproducing/recording unit that reads and writes information from and on a recording medium that is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 16:
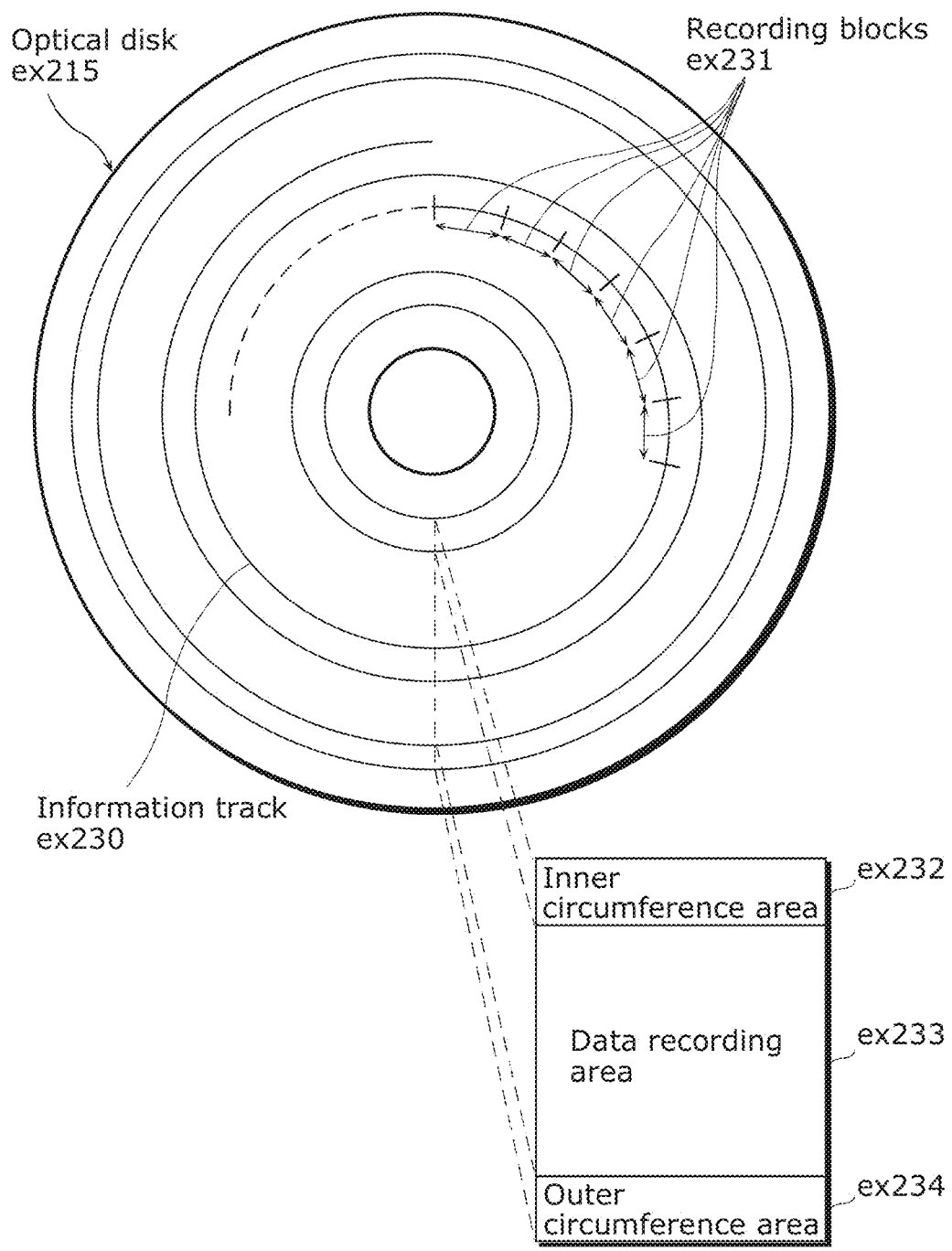
FIG. 16 shows an example of a configuration of a recording medium that is an optical disk.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 14. The same will be true for the configuration of the computer ex111, the cellular phone ex114, and others.

Figure 17A:
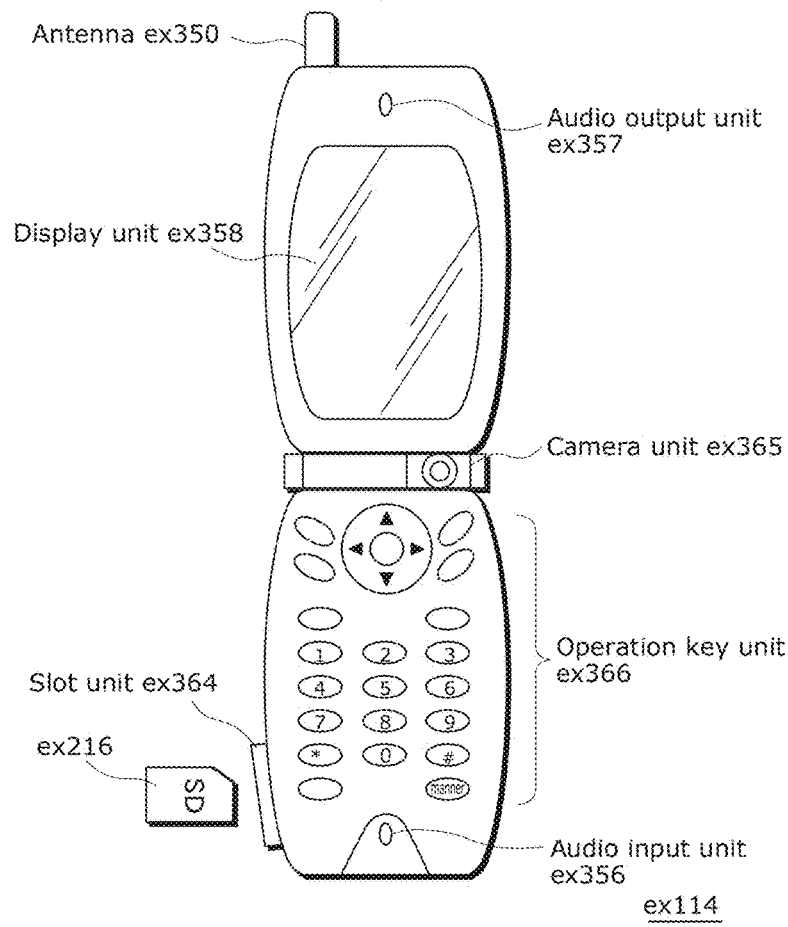
FIG. 17A shows an example of a cellular phone.

FIG. 17A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 17B:
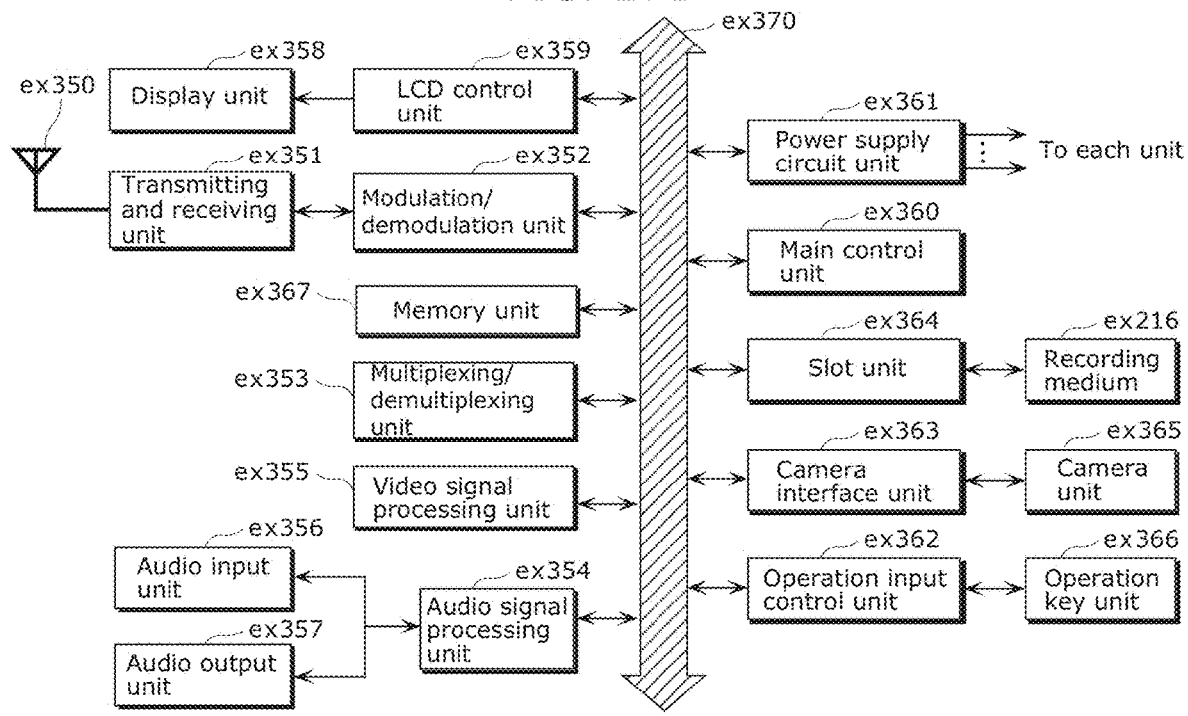
FIG. 17B is a block diagram showing an example of a configuration of a cellular phone.

Next, an example of a configuration of the cellular phone ex114 will be described with reference to FIG. 17B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present invention), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 18 illustrates a structure of the multiplexed data. As illustrated in FIG. 18, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 19:
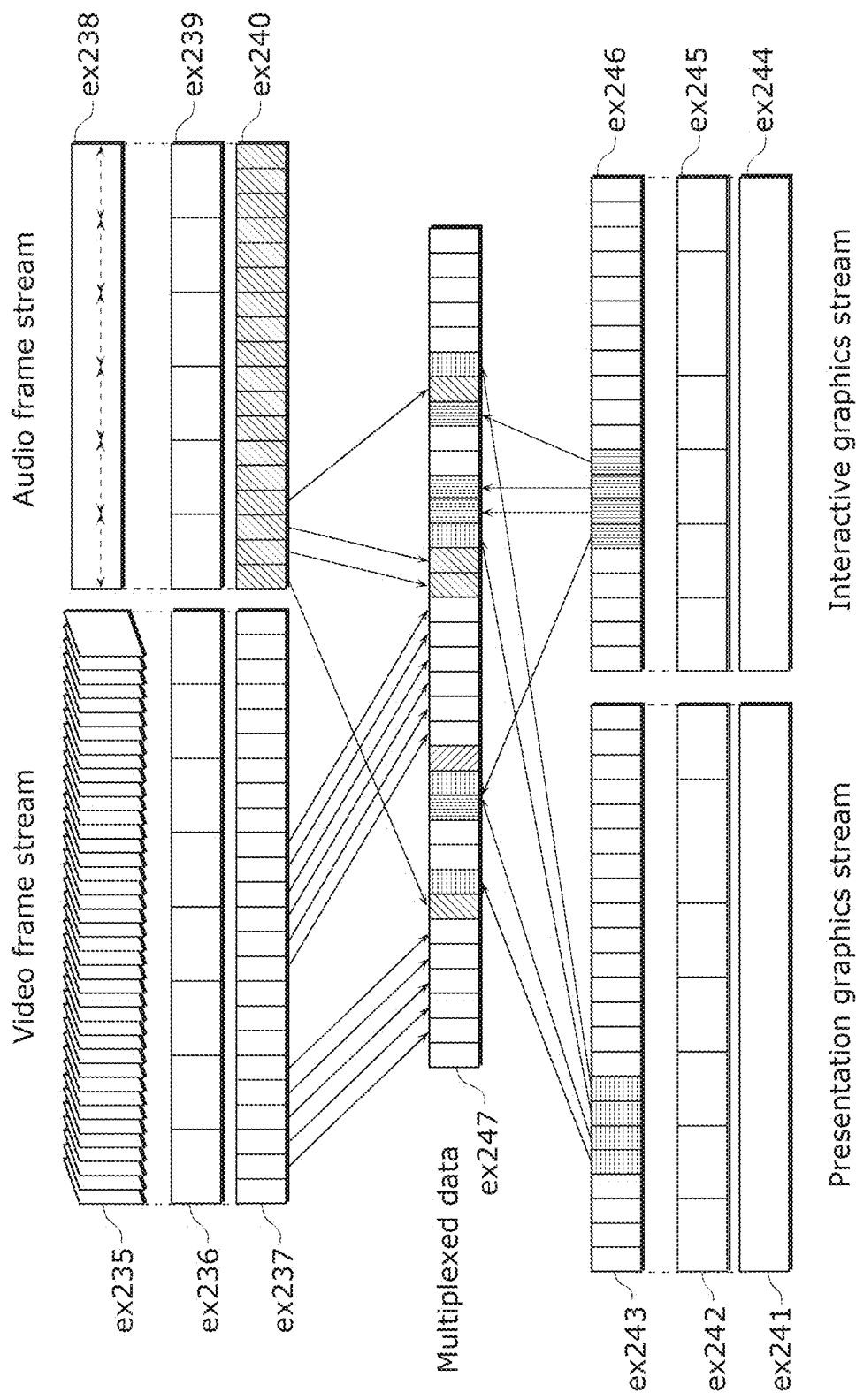
FIG. 19 schematically shows how each stream is multiplexed in multiplexed data.

FIG. 19 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 20:
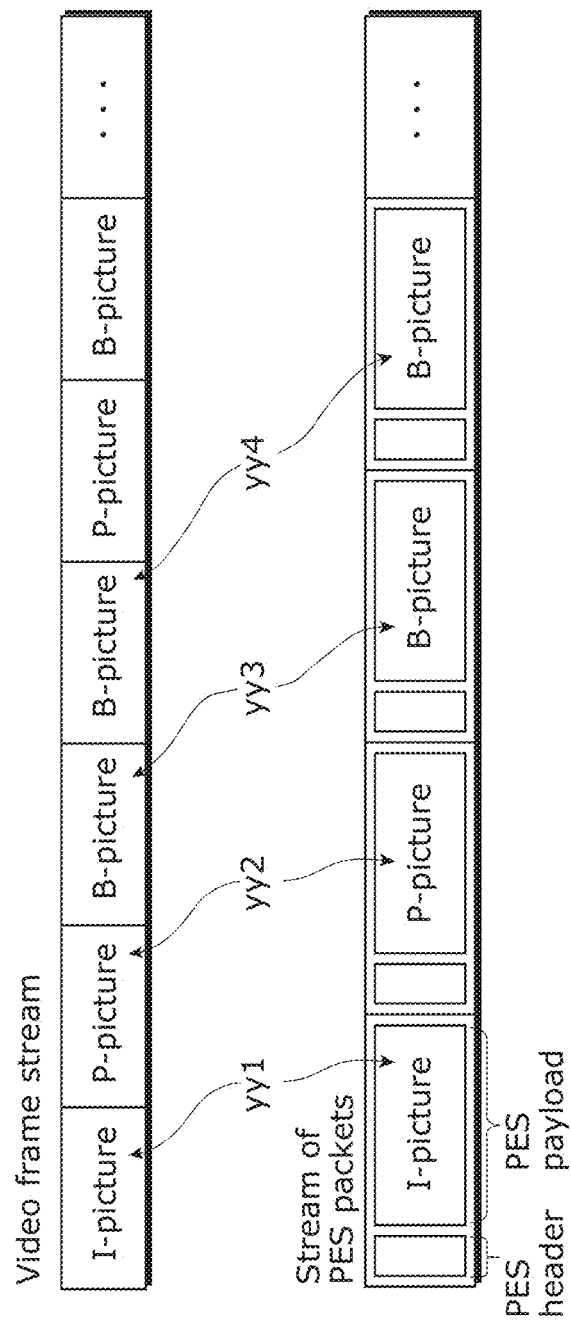
FIG. 20 shows how a video stream is stored in a stream of PES packets in more detail.

FIG. 20 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 20, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 21:
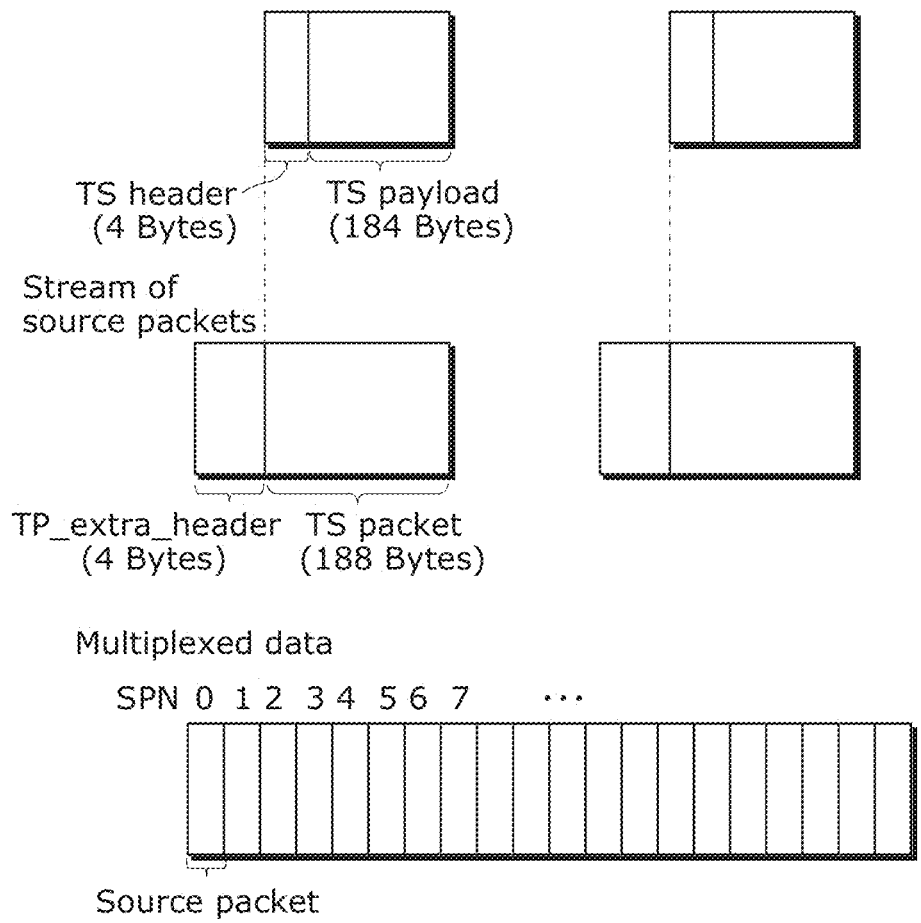
FIG. 21 shows a structure of TS packets and source packets in the multiplexed data.

FIG. 21 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 21. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores SIC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 22:
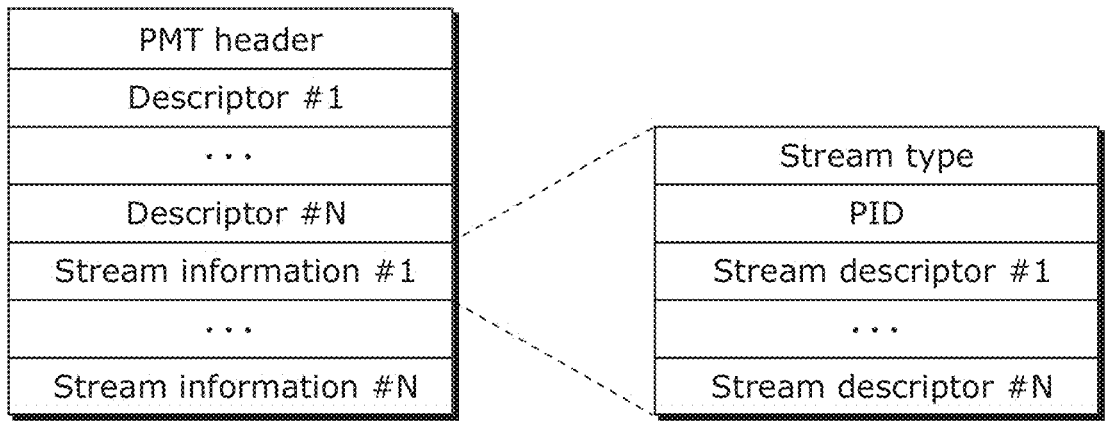
FIG. 22 shows a data structure of a PMT.

FIG. 22 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 23:
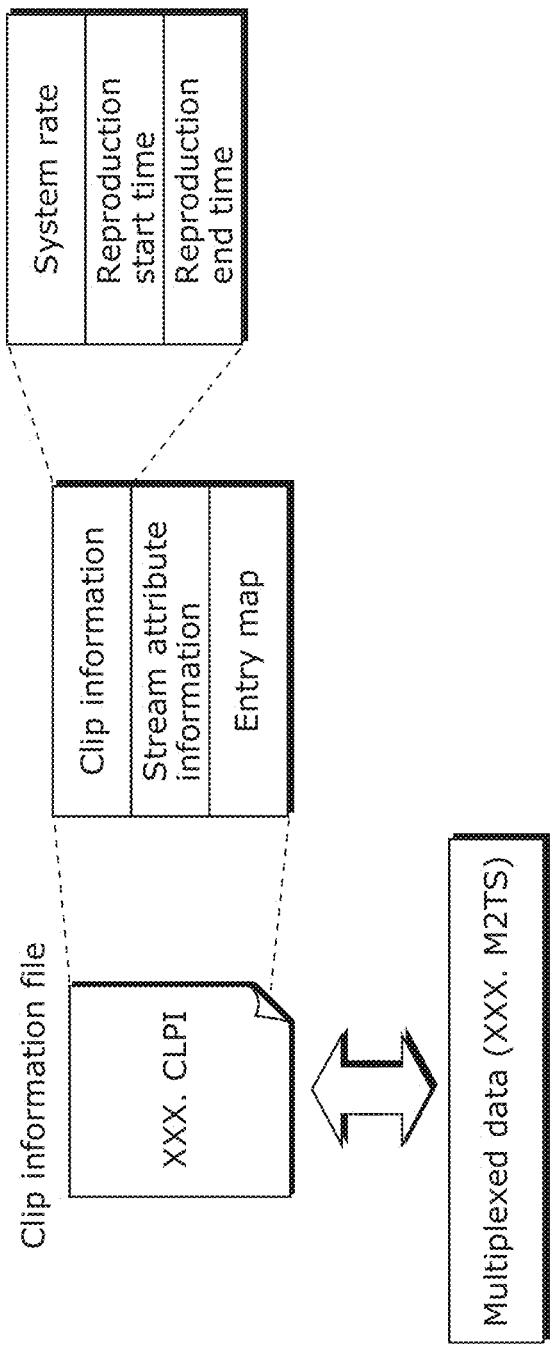
FIG. 23 shows an internal structure of multiplexed data information.

Each of the multiplexed data information files is management information of the multiplexed data as shown in FIG. 23. The multiplexed data information files are in one to one correspondence with the multiplexed data, and each of the files includes multiplexed data information, stream attribute information, and an entry map.

As illustrated in FIG. 23, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 24:
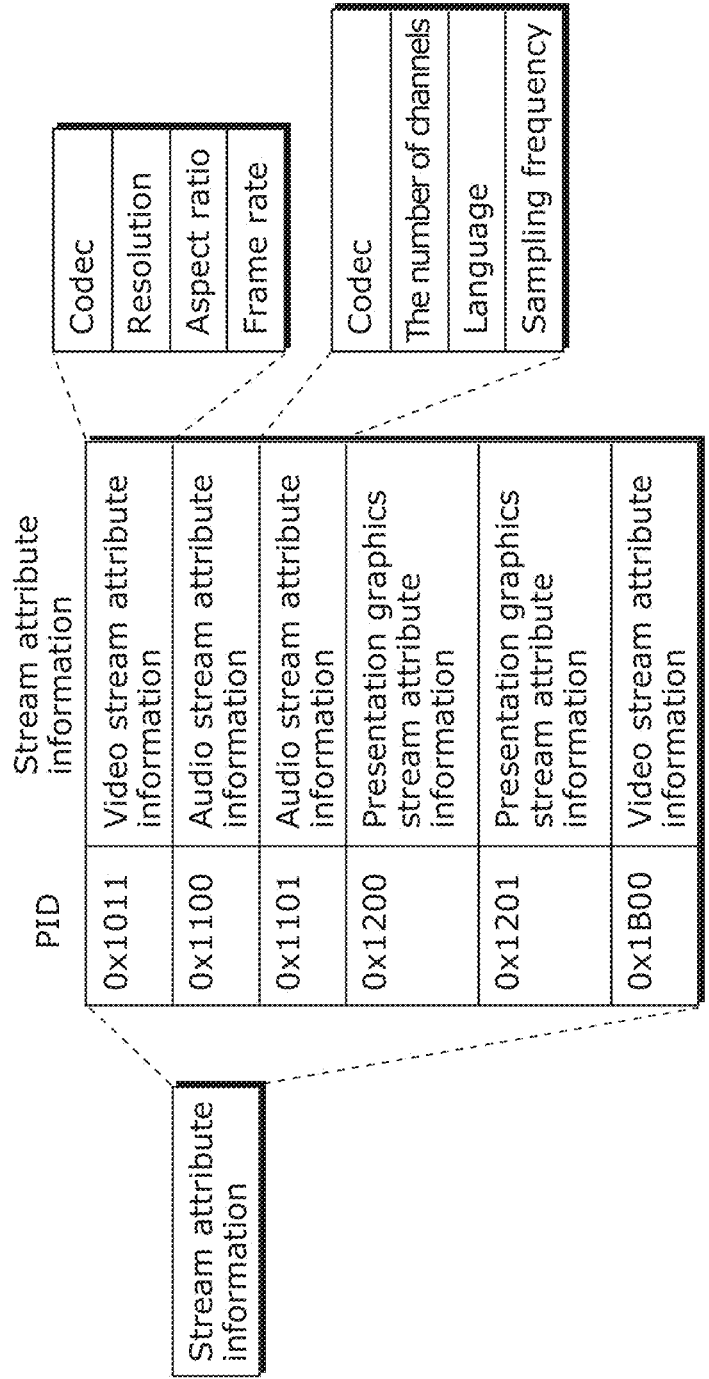
FIG. 24 shows an internal structure of stream attribute information.

As shown in FIG. 24, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is.

The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 25:
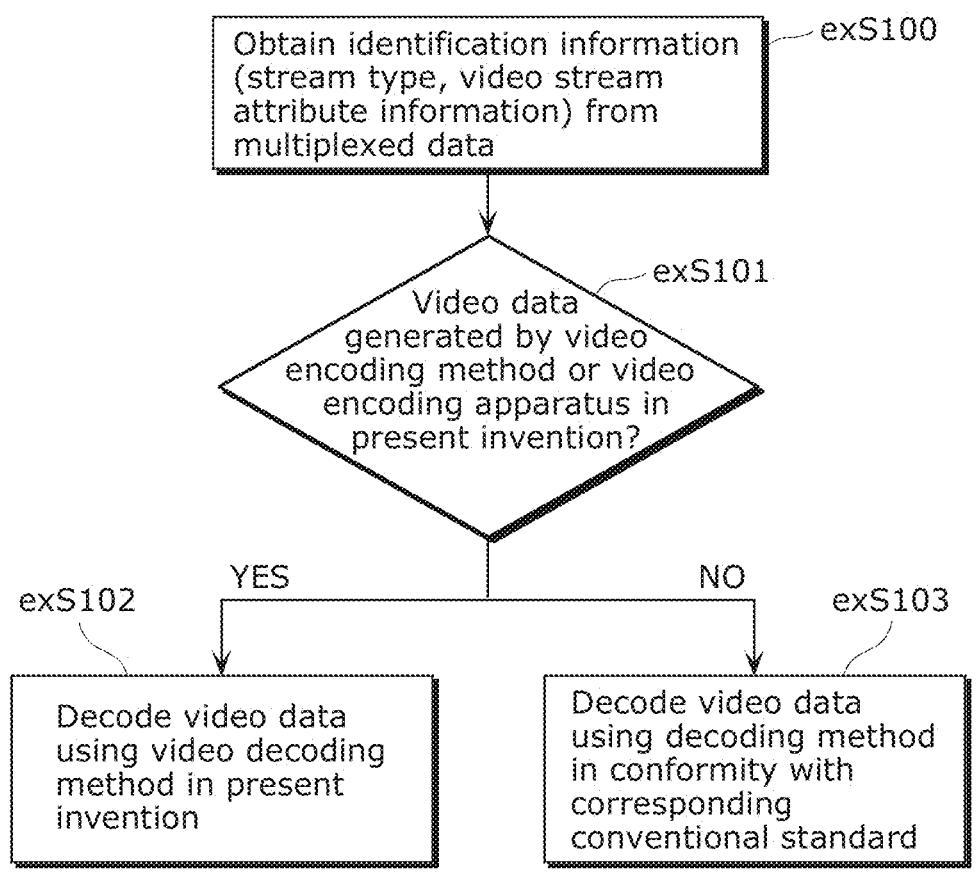
FIG. 25 shows steps for identifying video data.

Furthermore, FIG. 25 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 26:
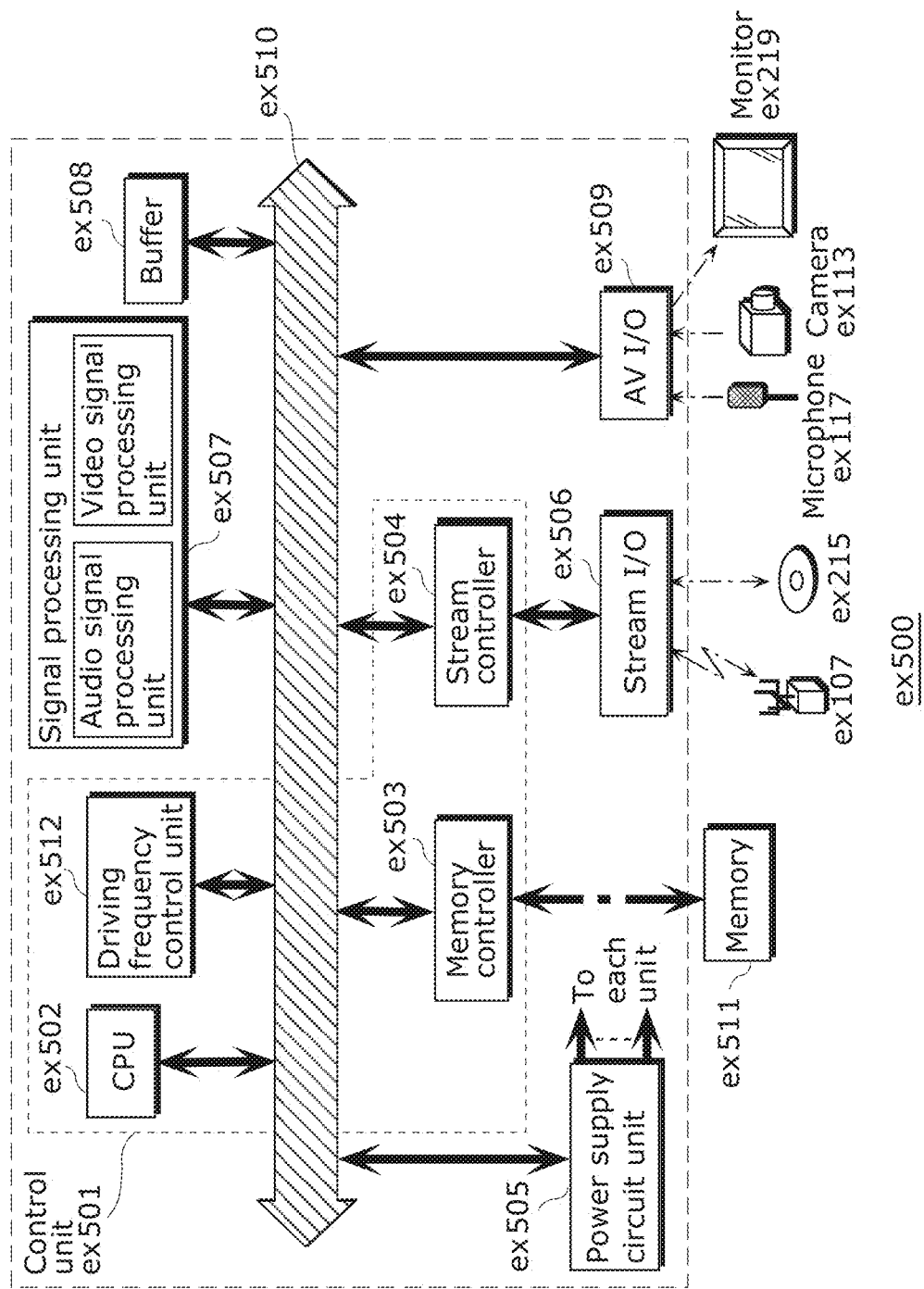
FIG. 26 shows an example of a configuration of an integrated circuit for implementing the moving picture coding method and the moving picture decoding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 26 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when a driving frequency is higher, there is a problem that the power consumption increases.

Figure 27:
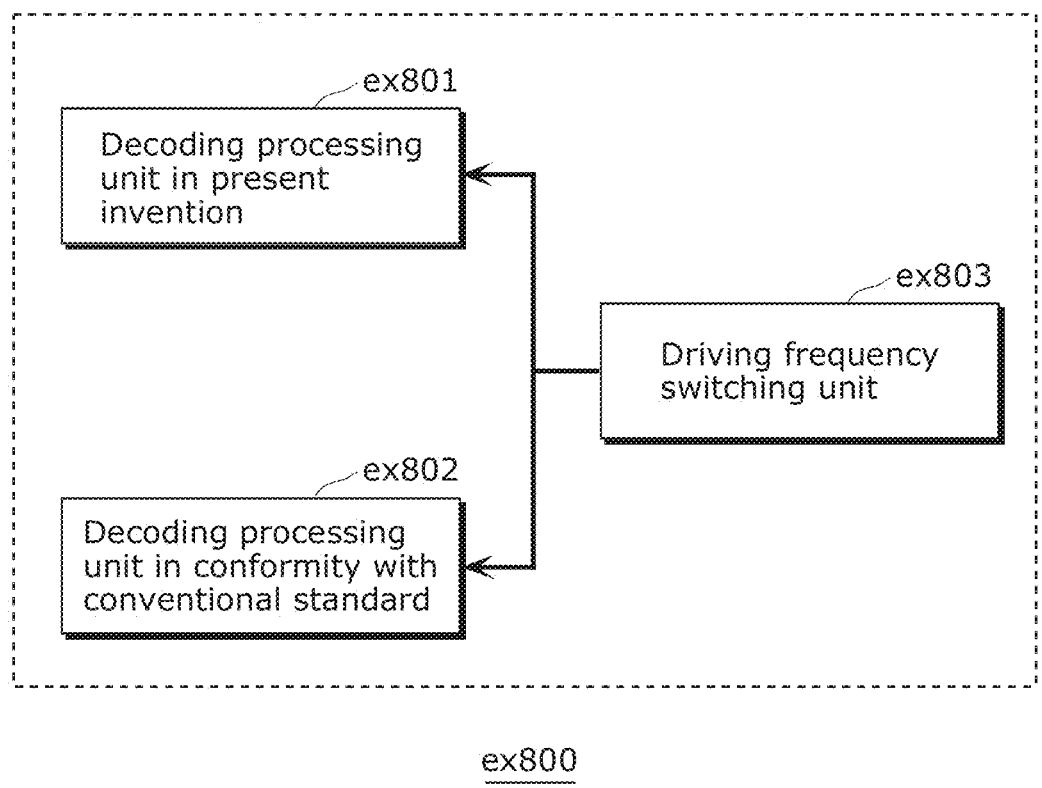
FIG. 27 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 27 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the moving picture decoding method described in each of embodiments and the decoding processing unit ex802 that conforms to the conventional standard corresponds to the signal processing unit ex507 in FIG. 26. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 29. The driving frequency can be selected by storing the look-up table in the buffer ex508 and in an internal memory of an LSI, and with reference to the look-up table by the CPU ex502.

Figure 28:
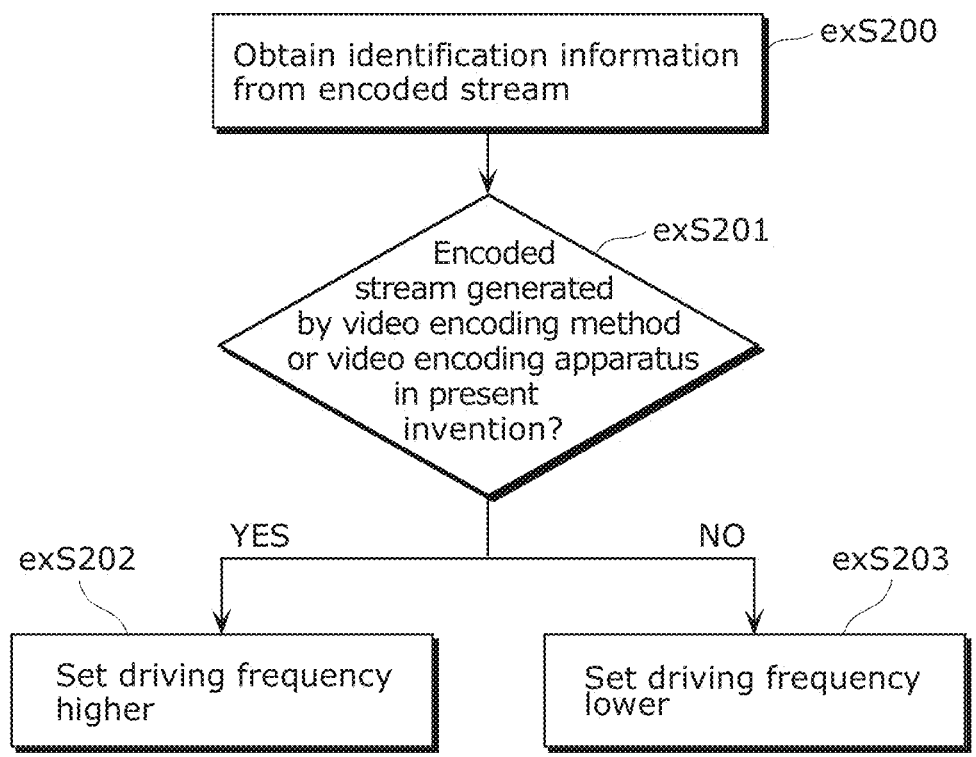
FIG. 28 shows steps for identifying video data and switching between driving frequencies.

FIG. 28 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 30A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 30B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

A moving picture encoding apparatus and a moving picture according to the present invention are applicable to various multimedia data and make it possible to increase decoding efficiency. For example, the moving picture encoding apparatus and the moving picture decoding apparatus are effective for a moving picture encoding apparatus and a moving picture decoding apparatus in storage, transmission and communication using a mobile phone, a DVD device, a personal computer, and the like.

REFERENCE SIGNS LIST

100 Spatially scalable-multiview moving picture encoding apparatus
101 Input image control unit
102 First downsampling unit
103 Base layer encoder
104 Enhancement layer encoder
105 First extension and decompression unit
106 Second downsampling unit
107 Enhancement view base layer encoder
108 Enhancement view enhancement layer encoder
109 Second extension and decompression unit
110 Priority determination unit
111 Hierarchy-view multiplexing unit
200 Spatially scalable-multiview moving picture decoding apparatus
201 Inverse multiplexing unit
202 Decoding control unit
203 Inverse view multiplexing unit
204 First inverse hierarchical multiplexing unit
205 Base layer decoder
206 Enhancement layer decoder
207 First extension and decompression unit
208 Second inverse hierarchical multiplexing unit
209 Enhancement view base layer decoder
210 Enhancement view enhancement layer encoder
211 Second extension and decompression unit
212, 213, 214 Switch

The invention claimed is:

1. A moving picture decoding apparatus which decodes encoded data, which is included in a bitstream, the moving picture decoding apparatus comprising:
a first decoder which decodes a base layer of a base view image;
a second decoder which decodes (i) a first enhancement layer of the base view image by referring to a picture in the first enhancement layer of the base view image and the base layer of the base view image without referring to any of a second enhancement layer of the base view image, the base layer of the enhancement view image, the first enhancement layer of the enhancement view image, and the second enhancement layer of the enhancement view image and (ii) a second enhancement layer of the base view image by referring to a picture in the second enhancement layer of the base view image and the first enhancement layer of the base view image without referring to any of the base layer of the base view image, the base layer of the enhancement view image, the first enhancement layer of the enhancement view image, and the second enhancement layer of the enhancement view image;
a third decoder which decodes the base layer of the enhancement view image by referring to the base layer of the base view image without referring to any of the first enhancement layer of the base view image, the second enhancement layer of the base view image, the base layer of the enhancement view image, the first enhancement layer of the enhancement view image, and the second enhancement layer of the enhancement view image; and a fourth decoder which decodes (i) the first enhancement layer of the enhancement view image by referring to a picture in the first enhancement layer of the enhancement view image, the first enhancement layer of the base view image, and the base layer of the enhancement view image without referring to any of the base layer of the base view image, the second enhancement layer of the base view image, and the second enhancement layer of the enhancement view image and (ii) the second enhancement layer of the enhancement view image by referring to a picture in the second enhancement layer of the enhancement view image, the second enhancement layer of the base view image, and the first enhancement layer of the enhancement view image without referring to any of the base layer of the base view image, the first enhancement layer of the base view image, and the base layer of the enhancement view image; and a controller which determines whether a target image for decoding is (i) the base layer of the base view image, (ii) the first enhancement layer of the base view image, (iii) the second enhancement layer of the base view image, (iv) the base layer of the enhancement view image, (v) the first enhancement layer of the enhancement view image, or (vi) the second enhancement layer of the enhancement view image, wherein when the controller determines that the target image is one of (i) the base layer of the base view image, (ii) the first enhancement layer of the base view image, (iii) the second enhancement layer of the base view image, (iv) the base layer of the enhancement view image, the target image is decoded using only (a) the first decoder and (b) one of the second decoder and the third decoder, wherein when the controller determines that the target image is one of (v) the first enhancement layer of the enhancement view image and (vi) the second enhancement layer of the enhancement view image, the target image is decoded using one of following combinations:
(a) the second decoder and the fourth decoder,
(b) the third decoder and the fourth decoder, or
(c) the second decoder, the third decoder, and the fourth decoder, wherein the base layer of the base view image, the first enhancement layer of the base view image, and the second enhancement layer of the base view image are images having the same content, where the first enhancement layer of the base view image has a higher resolution than the base layer of the base view image, and the second enhancement layer of the base view image has a higher resolution than the first enhancement layer of base view image, and wherein the base layer of the enhancement view image, the first enhancement layer of the enhancement view image, and the second enhancement layer of the enhancement view image are images having the same content, where the first enhancement layer of the enhancement view image has a higher resolution than the base layer of the enhancement view image, and the second enhancement layer of the enhancement view image has a higher resolution than the first enhancement layer of enhancement view image.

2. The moving picture decoding apparatus according to claim 1, wherein the encoded data is generated by the moving picture encoding apparatus.

3. The moving picture decoding apparatus according to claim 1,
wherein when the controller determines that the target image is (i) the base layer of the base view image, the target image is decoded using only the first decoder without using any of the second decoder, the third decoder, and the fourth decoder,
wherein when the controller determines that the target image is one of (ii) the first enhancement layer of the base view image and (iii) the second enhancement layer of the base view image, the target image is decoded using the first decoder and the second decoder without using any of the third decoder and the fourth decoder, and
wherein when the controller determines that the target image is (iv) the base layer of the enhancement view image, the target image is decoded using the first decoder and the third decoder without using any of the second decoder and the fourth decoder.

4. A moving picture decoding method for decoding encoded data, which is included in the bitstream, the moving picture decoding method comprising:
decoding a target image for decoding by performing one or more decoding processes including
a first decoding process of decoding a base layer of a base view image,
a second decoding process of decoding (i) a first enhancement layer of the base view image by referring to a picture in the first enhancement layer of the base view image and the base layer of the base view image without referring to any of a second enhancement layer of the base view image, the base layer of the enhancement view image, the first enhancement layer of the enhancement view image, and the second enhancement layer of the enhancement view image and (ii) a second enhancement layer of the base view image by referring to a picture in the second enhancement layer of the base view image and the first enhancement layer of the base view image without referring to any of the base layer of the base view image, the base layer of the enhancement view image, the first enhancement layer of the enhancement view image, and the second enhancement layer of the enhancement view image,
a third decoding process of decoding the base layer of the enhancement view image by referring to the base layer of the base view image without referring to any of the first enhancement layer of the base view image, the second enhancement layer of the base view image, the base layer of the enhancement view image, the first enhancement layer of the enhancement view image, and the second enhancement layer of the enhancement view image, and
a fourth decoding process of decoding (i) the first enhancement layer of the enhancement view image by referring to a picture in the first enhancement layer of the enhancement view image, the first enhancement layer of the base view image, and the base layer of the enhancement view image without referring to any of the base layer of the base view image, the second enhancement layer of the base view image, and the second enhancement layer of the enhancement view image and (ii) the second enhancement layer of the enhancement view image by referring to a picture in the second enhancement layer of the enhancement view image, the second enhancement layer of the base view image, and the first enhancement layer of the enhancement view image without referring to any of the base layer of the base view image, the first enhancement layer of the base view image, and the base layer of the enhancement view image; and determining whether the target image for decoding is (i) the base layer of the base view image, (ii) the first enhancement layer of the base view image, (iii) the second enhancement layer of the base view image, (iv) the base layer of the enhancement view image, (v) the first enhancement layer of the enhancement view image, or (vi) the second enhancement layer of the enhancement view image, wherein when the determining determines that the target image is one of (i) the base layer of the base view image, (ii) the first enhancement layer of the base view image, (iii) the second enhancement layer of the base view image, (iv) the base layer of the enhancement view image, the decoding the target image decodes the target image using only (a) the first decoding and (b) one of the second decoding and the third decoding, wherein when the determining determines that the target image is one of (v) the first enhancement layer of the enhancement view image and (vi) the second enhancement layer of the enhancement view image, the decoding the target image decodes the target image using one of following combinations:
 (a) the second decoding and the fourth decoding,
 (b) the third decoding and the fourth decoding, or
 (c) the second decoding, the third decoding, and the fourth decoding, wherein the base layer of the base view image, the first enhancement layer of the base view image, and the second enhancement layer of the base view image are images having the same content, where the first enhancement layer of the base view image has a higher resolution than the base layer of the base view image, and the second enhancement layer of the base view image has a higher resolution than the first enhancement layer of base view image, and wherein the base layer of the enhancement view image, the first enhancement layer of the enhancement view image, and the second enhancement layer of the enhancement view image are images having the same content, where the first enhancement layer of the enhancement view image has a higher resolution than the base layer of the enhancement view image, and the second enhancement layer of the enhancement view image has a higher resolution than the first enhancement layer of enhancement view image.

5. The moving picture decoding method according to claim 4, wherein the encoded data is generated by the moving picture encoding apparatus.

6. The moving picture decoding method according to claim 4,
 wherein when the determining determines that the target image is (i) the base layer of the base view image, the decoding the target image decodes the target image using the first decoding without using any of the second decoding, the third decoding, and the fourth decoding,
 wherein when the determining determines that the target image is one of (ii) the first enhancement layer of the base view image and (iii) the second enhancement layer of the base view image, the decoding the target image decodes the target image using the first decoding and the second decoding without using any of the third decoding and the fourth decoding, and
 wherein when the determining determines that the target image is (iv) the base layer of the enhancement view image, the decoding the target image decodes the target image using the first decoding and the third decoding without using any of the second decoding and the fourth decoding.

* * * * *